(12) United States Patent
Kitamura et al.

(10) Patent No.: US 6,247,012 B1
(45) Date of Patent: Jun. 12, 2001

(54) INFORMATION RECEPTION AND DELIVERY SYSTEM USING GLOBAL AND LOCAL DIRECTORY TABLES IN AN INTRANET

(75) Inventors: Koji Kitamura, Kanazawa; Akira Kubota, Yokohama; Shinya Abe, Zama; Toshikuni Hamano, Yokohama; Kotaro Tsukuda, Yamato; Shigeru Miki, Hachioji, all of (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 09/091,902

(22) PCT Filed: Oct. 28, 1997

(86) PCT No.: PCT/JP97/03899

§ 371 Date: Sep. 28, 1998

§ 102(e) Date: Sep. 28, 1998

(87) PCT Pub. No.: WO98/19255

PCT Pub. Date: May 7, 1998

(30) Foreign Application Priority Data

Oct. 28, 1996 (JP) .................................................. 8-285004
Oct. 28, 1996 (JP) .................................................. 8-285005
Oct. 28, 1996 (JP) .................................................. 8-285006

(51) Int. Cl.$^7$ ...................................................... G06F 17/30
(52) U.S. Cl. ............................ 707/10; 707/200; 709/225; 709/230; 709/232; 709/245
(58) Field of Search ............................ 707/103, 10, 200; 709/225, 230, 232, 245; 706/230

(56) References Cited

U.S. PATENT DOCUMENTS

| | | | | |
|---|---|---|---|---|
| 5,530,703 | * | 6/1996 | Liu et al. .............................. | 370/255 |
| 5,606,668 | * | 2/1997 | Shwed .................................. | 713/201 |
| 5,614,927 | * | 3/1997 | Gifford et al. ....................... | 707/531 |
| 5,740,549 | * | 4/1998 | Reilly et al. .......................... | 705/14 |
| 5,774,656 | * | 6/1998 | Hattori et al. ....................... | 709/223 |
| 5,842,224 | * | 11/1998 | Fenner ................................ | 711/202 |
| 5,884,033 | * | 3/1999 | Duvall et al. ........................ | 709/206 |

\* cited by examiner

Primary Examiner—Paul R. Lintz

(57) ABSTRACT

An information reception and delivery system receives and delivers private information produced and delivered within an internal network 100 and global information reception from an external network 200 connected to the internal network 100. A directory includes information sources (or servers) and reception information used for receiving the information. A predetermined high-level server 110 of the system manages reception and delivery performed by other servers 120 etc. provided in the internal network, through use of both a global directory table 1 holding a directory regarding the global information and a private directory table 2 holding a directory regarding the private information.

10 Claims, 28 Drawing Sheets

FIG. 7

| CONTENT NAME | | DELIVERY ENABLING FLAG | UPLOAD ENABLING FLAG |
|---|---|---|---|
| a | (NEWS STORIES OF NEWSPAPER A) | ENABLED | UPLOAD PROHIBITED |
| b | (NEWS RELATED TO GAMBLING B) | PROHIBITED | UPLOAD PROHIBITED |
| c | (WEATHER FORECAST C) | ENABLED | UPLOAD PROHIBITED |
| x | (PERSONNEL NOTICE X) | ENABLED | UPLOAD ENABLED |
| y | (NEWS FROM GENERAL SECRETARY SECTION Y) | PROHIBITED | UPLOAD PROHIBITED |

FIG. 11A
| CONTENT NAME | DELIVERY ENABLING | |
|---|---|---|
| ⋮ | ⋮ | |
| x (PERSONNEL NOTICE X) | PROHIBITED | .. |
FIG. 11B
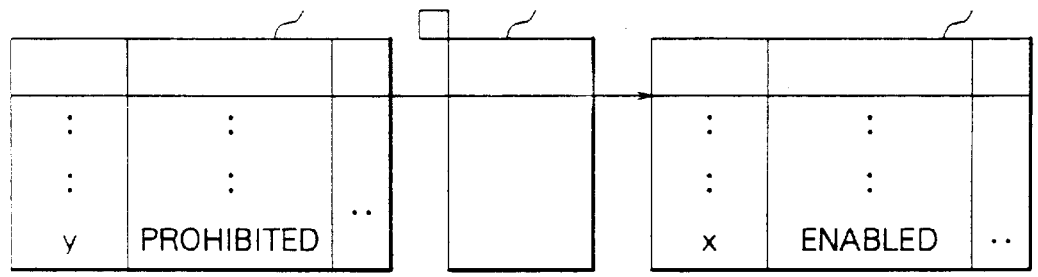
FIG. 11C
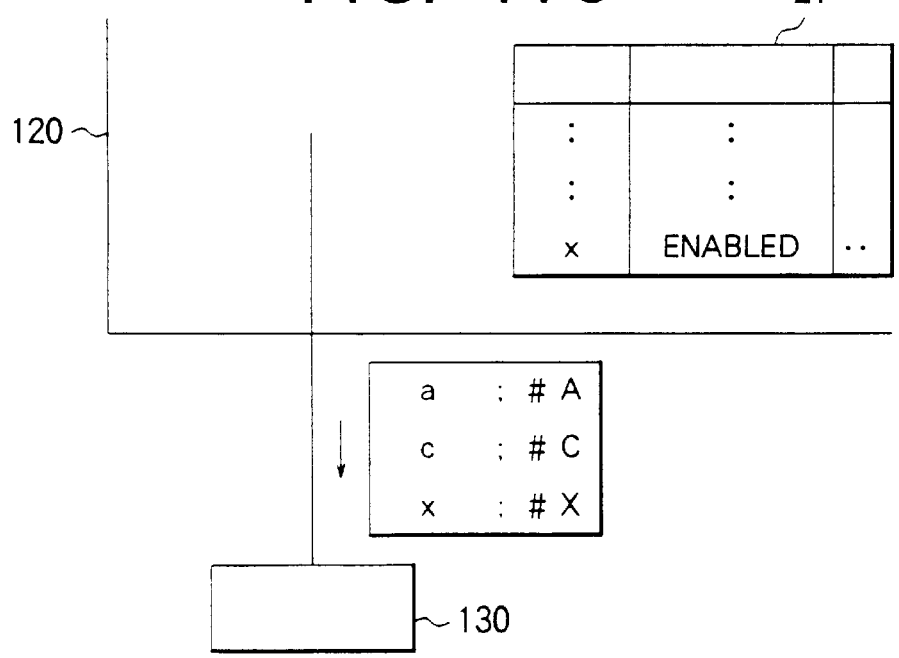

FIG. 21

| ATTRIBUTE | CONTENT TITLE | | CONTENT ITEMS SUPPLY SERVER |
|---|---|---|---|
| PROHIBITED | SPORTS | BASEBALL | .w\|w. spt. co. jp/sports/baseball/ |
| PROHIBITED | SPORTS | SUMOU | .w\|w. spt. co. jp/sports/sumou/ |
| — | NEWS | NEWSPAPER C | .w\|w. abc. co. jp/news/ccccc/ |
| — | NEWS | NEWSPAPER B | .w\|w. abc. co. jp/news/bbbbb/ |
| — | NEWS | NEWSPAPER A | .w\|w. abc. co. jp/news/aaaaa/ |
| — | NATIONAL WEATHER FORECAST | | |
| — | WEATHER FORECAST | HOKKAIDO | .w\|w. wtr. co. jp/weather/japan/j0/ |
| — | WEATHER FORECAST | TOHOKU | .w\|w. wtr. co. jp/weather/japan/j1/ |
| — | WEATHER FORECAST | KANTO | .w\|w. wtr. co. jp/weather/japan/j2/ |
| — | WEATHER FORECAST | CHUBU | .w\|w. wtr. co. jp/weather/japan/j3/ |
| — | WEATHER FORECAST | KINKI | .w\|w. wtr. co. jp/weather/japan/j4/ |
| — | WEATHER FORECAST | SHIKOKU CHUGOKU | .w\|w. wtr. co. jp/weather/japan/j5/ |
| — | WEATHER FORECAST | KYUSHU OKINAWA | .w\|w. wtr. co. jp/weather/japan/j6/ |
| — | WEATHER FORECAST | | .w\|w. wtr. co. jp/weather/japan/j7/ |
| — | WORLDWIDE WEATHER FORECAST | | .w\|w. sml. co. jp/weather/world/w0/ |
| MANDATORY | INTRA-ENTERPRISE | PERSONNEL AND GENERAL AFFAIRS SECTION | soumu. abc. co. jp/news/ |
| — | INTRA-ENTERPRISE | TELEPHONE DIRECTORY | soumu. abc. co. jp/data/tel/ |
| — | INTRA-ENTERPRISE | FIRST DEVELOPMENT DEPARTMENT | dev1. abc. co. jp/news/ |
| — | INTRA-ENTERPRISE | SECOND DEVELOPMENT DEPARTMENT | dev2. abc. co. jp/news/ |

FIG. 22

| ATTRIBUTE | CONTENT TITLE | | CONTENT ITEMS SUPPLY SERVER |
|---|---|---|---|
| MANDATORY | INTRA-ENTERPRISE | PERSONNEL AND GENERAL AFFAIRS SECTION | soumu.abc.co.jp/news/ |
| — | INTRA-ENTERPRISE | TELEPHONE DIRECTORY | soumu.abc.co.jp/data/tel/ |
| — | INTRA-ENTERPRISE | FIRST DEVELOPMENT DEPARTMENT | dev1.abc.co.jp/news/ |
| — | NEWS | NEWSPAPER C | w\|w.abc.co.jp/news/ccccc/ |
| — | NEWS | NEWSPAPER B | w\|w.abc.co.jp/news/bbbbb/ |
| — | NEWS | NEWSPAPER A | w\|w.abc.co.jp/news/aaaaa/ |
| — | NATIONAL WEATHER FORECAST | | w\|w.wtr.co.jp/weather/japan/j0/ |
| — | WEATHER FORECAST WEEKLY FORECAST KANTO | | w\|w.wtr.co.jp/weather/japan/j3/ |
| — | WORLDWIDE WEATHER FORECAST | | w\|w.sml.co.jp/weather/world/w0/ |

FIG. 23

| ATTRIBUTE | CONTENT TITLE | CONTENT ITEMS SUPPLY SERVER |
|---|---|---|
| MANDATORY | INTRA-ENTERPRISE | soumu.abc.co.jp/news/ |
| — | INTRA-ENTERPRISE | PERSONNEL AND GENERAL AFFAIRS SECTION |
| — | | FIRST DEVELOPMENT DEPARTMENT dev1.abc.co.jp/news/ |
| — | NEWS | NEWSPAPER C  wlw.abc.co.jp/news/ccccc/ |
| — | NEWS | NEWSPAPER B  wlw.abc.co.jp/news/bbbbb/ |
| — | NEWS | NEWSPAPER A  wlw.abc.co.jp/news/aaaaa/ |
| — | NATIONAL WEATHER FORECAST | wlw.wtr.co.jp/weather/japan/j0/ |

FIG. 24

| ATTRIBUTE | CONTENT TITLE | | CONTENT ITEMS SUPPLY SERVER |
|---|---|---|---|
| MANDATORY | INTRA-ENTERPRISE | PERSONNEL AND GENERAL AFFAIRS SECTION | soumu. abc. co. jp/news/ |
| — | INTRA-ENTERPRISE | FIRST DEVELOPMENT DEPARTMENT | dev1. abc. co. jp/news/ |
| — | NEWS | NEWSPAPER C | w|w. abc. co. jp/news/ccccc/ |
| — | NEWS | NEWSPAPER B | w|w. abc. co. jp/news/bbbbb/ |
| — | NEWS | NEWSPAPER A | w|w. abc. co. jp/news/aaaaa/ |

INFORMATION RECEPTION AND DELIVERY SYSTEM USING GLOBAL AND LOCAL DIRECTORY TABLES IN AN INTRANET

BACKGROUND OF THE INVENTION

1. Field of the Invention

The present invention relates to an information reception and delivery system, and more particularly, to an information reception and delivery system which

- receives and delivers information on the basis of contents of the information in a consolidated manner;
- displays on a display screen of a client terminal which performs ordinary tasks, such as word processing jobs, business information having a determined degree of necessity or openness such as outside or in-house information; and
- delivers to and displays on the client terminal business information which is provided from outside or within a company and which includes a plurality of content items.

2. Background Art

In association with recent development of a computer network, various types of public information are received and delivered across individual users such as corporations or persons by way of the computer network. For example, ordinary individuals can read newspaper stories delivered from a newspaper company over the computer network. In another case, a certain corporation opens its own information as public information to which everybody can freely gain access over the Internet.

In contrast, a corporation connects together its branch offices, sales offices, factories, and laboratories over a computer network in the form of an intranet. In general, the corporation has a necessity to manage its in-house information and owns a large number of terminals. For these reasons, the corporation usually employs a treelike connection instead of direct mutual interconnection among terminals of its employees. For instance, an employee can receive or deliver necessary information by making access to a host computer (a higher-level server) installed in the head office, through use of his terminal and by way of a host computer (a lower-level server) installed in his sales office.

In establishing an intranet (or a network designed for exclusive use of a corporation or a private network), the intranet is usually mutually connected to external networks such as the Internet (or a global network). Such a connection is considered to be inevitable for reasons of returns on investments, business, management, etc. In fact, such a configuration is adopted for establishing a network. Accordingly, various types of information can be received by a terminal of the corporation by making access to, e.g., the Internet, whereas various types of information can be delivered from the terminal over the Internet.

As mentioned above, so long as a necessary password and the like are obtained, various types of information can be substantially freely received by or delivered from every terminal by means of connection among the networks. However, such a high degree of convenience of the network adversely poses various problems.

For example, it is conceivable that information whose content items are irrelevant to the business of the corporation will be received by an employee making access to the external network from a terminal located in the corporation. More specifically, a certain employee receives personally-interesting information, e.g., information about gambling, and personally uses the thus-gained information.

It is also conceivable that, because of the high degree of convenience of the network, an excessive amount of information delivered or received over the intranet buries primarily essential information. In short, information is not reliably transmitted to the employees who use terminals, because of lack of indiscrimination with regard to content items of information, among information required to be necessarily transmitted to every terminal, information which should not be delivered to every terminal, information which does not have to be transmitted to every terminal, and the like.

For this reason, the intranet is required to control received information or information to be delivered according to its content items. Further, it is necessary to handle in a consolidated manner information which should be received and delivered within the intranet (e.g., in-house information) and information which are received from or delivered to the outside of the network while discriminating these information items from one another.

There has already been practiced displaying on a client terminal business information received and delivered by servers; i.e., external information such as newspaper stories and a weather forecast and in-house information such as notices and news from a secretariat. However, the employees cannot know in real time the business information received from the server while performing tasks such as word processing jobs. Content items of business information of this type received from servers are updated and change with elapse of time. However, when the user is performing a routine work, such as word processing operation, the user cannot display the contents of changing information. In order to display such business information, a conventional network requires the user to temporarily interrupt his routine work now being performed, such as word processing operations, and to switch the screen to an at-a-glance list of headlines of information, which has been received and delivered, or to a screen on which the details therefore are displayed. Obviously, such an action renders work inefficient.

Business information including a lot of content items are conventionally provided in unique format or style from outside the corporation or from within the corporation. Therefore, such business information cannot be displayed on the client terminal in a consolidated form of presentation. For example, news stories received from newspaper company A and newspaper company B may be identical with each other in terms of news content items. However, these news stories are not displayed in the same number of characters per line or in the same number of lines per page.

The content items of news and material incorporated therein are integrally managed. With regard to material sources stored in the server, the main body of material is accessed by identification of a file name on the basis of a news headline (i.e., a title or abstract) and a management table which includes file names regarding the main body of material in the form of a table. In this way, the news content items cannot be readily accessed.

An object of the present invention is to provide an information reception and delivery system which receives or delivers information in a consolidated manner on the basis of the content items of the information.

Another object of the present invention is to provide an information reception and delivery system which receives and delivers information in a consolidated manner on the basis of the content items of the information while discriminating information produced and delivered within an intranet and information received from an external network.

Still another object of the present invention is to provide an information reception and delivery system which receives and delivers the information produced within the intranet on the basis of the content items of the information.

Yet another object of the present invention is to provide means which allows the user to be aware of real-time business information received and delivered by way of servers, such as external information or in-house information, while continually performing his routine work, as well as to perform switching to displaying details of the business information on a client terminal and to receiving the information, as required, through use of display mode switch control means.

A further object of the present invention is to enable the display mode switch control means to readily and arbitrarily perform switching according to the way in which a terminal user uses the terminal.

A still further object of the present invention is to allow the user to arbitrarily switch the form of presentation of the business information according to his preferences in response to the switching action of the display mode switch control means.

A yet further object of the present invention is to make it easy for the user to customize the business information displayed on the client terminal according to his preferences on the basis of an information management table in which setting is made as to whether or not information is displayed for each display mode according to the degree of necessity or openness, as well as to allow the user to receive desired information solely by selecting the information on the screen.

A still further object of the present invention is to provide a client terminal with material sources stored in a server while their presentation forms are converted when business information—which contains a lot of business content items and which is supplied from outside the corporation or from within the corporation—is delivered to and displayed on the client terminal, as well as to perform conversion of the presentation forms in a consolidated manner common among the plurality of content items.

A yet further object of the present invention is to allow the user to display on a client terminal information which is customized for him according to the degree of necessity or openness by providing the system with a contents management table, as well as to make it easy for the user to prepare such a contents management table by providing an original contents list table in a shared manner.

A still further object of the present invention is to simplify a data structure and a system structure by managing content items and material included therein through use of different management tables.

An additional object of the present invention is to decentralize a time to deliver material from a server to client terminals by setting an extent of time in order to prevent material from being delivered at too high a volume at a specific time.

SUMMARY OF THE INVENTION

To these ends, the present invention provides an information reception and delivery system which receives and delivers private information produced and delivered within an internal network and global information received from an external network connected to the internal network, wherein a predetermined high-level server provided in the internal network is provided with a global directory table for retaining the global information in the form of a directory composed of a source of information and reception information used for receiving the information, as well as a private directory table for retaining the private information in the form of a directory composed of a source of information and reception information used for receiving the information, wherein the high-level server manages the reception and delivery of information performed by other servers provided within the internal network through use of the global directory table and the private directory table.

The foregoing information reception and delivery system according to the present invention enables retention of reception information regarding the global information and the private information beforehand for each information item, by means of the global directory table and the private directory table. As a result, the reception and delivery of the information itself (or the main body of the information) can be controlled, based on the reception information of each information item, by managing the global information and the private information in a consolidated manner while these information items are discriminated from each other.

Accordingly, even when a private network, such as an intranet, is mutually connected to an external public network (such as a global network), the present invention enables management of information to be received and delivered in terms of its contents. This enables consolidated handling of information that is received/delivered within a network while information to be received/delivered solely within the intranet is discriminated from the information received from the external network.

In one preferred mode of the invention, the present invention also provides an information reception and delivery system which displays on a display screen of a client terminal external or intra-enterprise business information received and delivered by way of a server, the system comprising: news reader mode display means which is capable of selecting a specific material from a plurality of materials that have been received and delivered and of displaying the thus-selected material; scroll mode display means which displays in a portion of a routine-operation display screen headlines of the business information in a scrolling manner; headline list mode display means which automatically displays a list of headlines of the business information over the entire screen surface and which updates the headlines; and display mode changeover control means for controlling switching among the news reader mode display means, the scroll mode display means, and the headline list mode display means, wherein the business information is displayed while its presentation form is changed.

When external or intra-enterprise business information received and delivered by way of a server is displayed on a display screen of a client terminal, the business information can be displayed while the display mode is ready and arbitrary changed among a news reader mode display, a scroll mode display which displays in a portion of a routine-operation display screen headlines of the business information in a scrolling manner, and a headline list mode display which displays a list of headlines of the business information over the entire screen surface. Particularly, as a result of a list of headlines of business information being displayed in a portion of the routine-operation display screen in a scrolling manner, the present invention enables the user to become aware of, in real time, business information such as external information or intra-enterprise information received and delivered by way of various servers while continually performing ordinary tasks. If necessary, the user can display the details of the information on the client terminal by switching.

In another preferred mode of the invention, the present invention provides an information reception and delivery system, wherein external or intra-enterprise business information, which is supplied from outside the corporation or from within the corporation and which contains a plurality of content items, are delivered to and displayed on a display screen of a client terminal, the system comprising: a server which stores a contents list, material sources included in the content items, and a list of the material sources and which provides material sources having converted presentation forms, in response to a material delivery request from the client terminal; and contents management means, material management means, and display means provided in the client terminal, wherein the contents management means requests the server to provide a material list contained in a selected content item, on the basis of a contents management table for browsing purposes in which a degree of necessity or openness is determined for each client; the material management means requests the server to provide a selected material, on the basis of a material management table which is formed for each of content items from a material list returned from the server; and the display means displays on the client terminal the material returned from the server.

When business information—which is supplied from outside the corporation or from within the corporation and which contains a plurality of content items—is delivered to and displayed on a display screen of a client terminal, the present invention makes it possible to consolidate the forms of presentation of information into one presentation form common among the plurality of content items by providing the material sources stored in the server to the client terminal while their presentation forms are converted.

BRIEF DESCRIPTION OF THE DRAWINGS

FIG. 7 is an explanatory diagram for describing the management of directories.

FIG. 11 is an explanatory diagram for describing the downloading of the directory.

FIG. 21 shows one example of a management table of an original contents list stored in a server.

FIG. 22 shows one example of a management table of a contents list for a news reader mode display purpose.

FIG. 23 shows one example of a management table of a contents list for a single line scroll display purpose.

FIG. 24 shows one example of a management table of a contents list for a headline list mode display purpose.

BEST MODE FOR CARRYING OUT THE INVENTION

Figure 1:
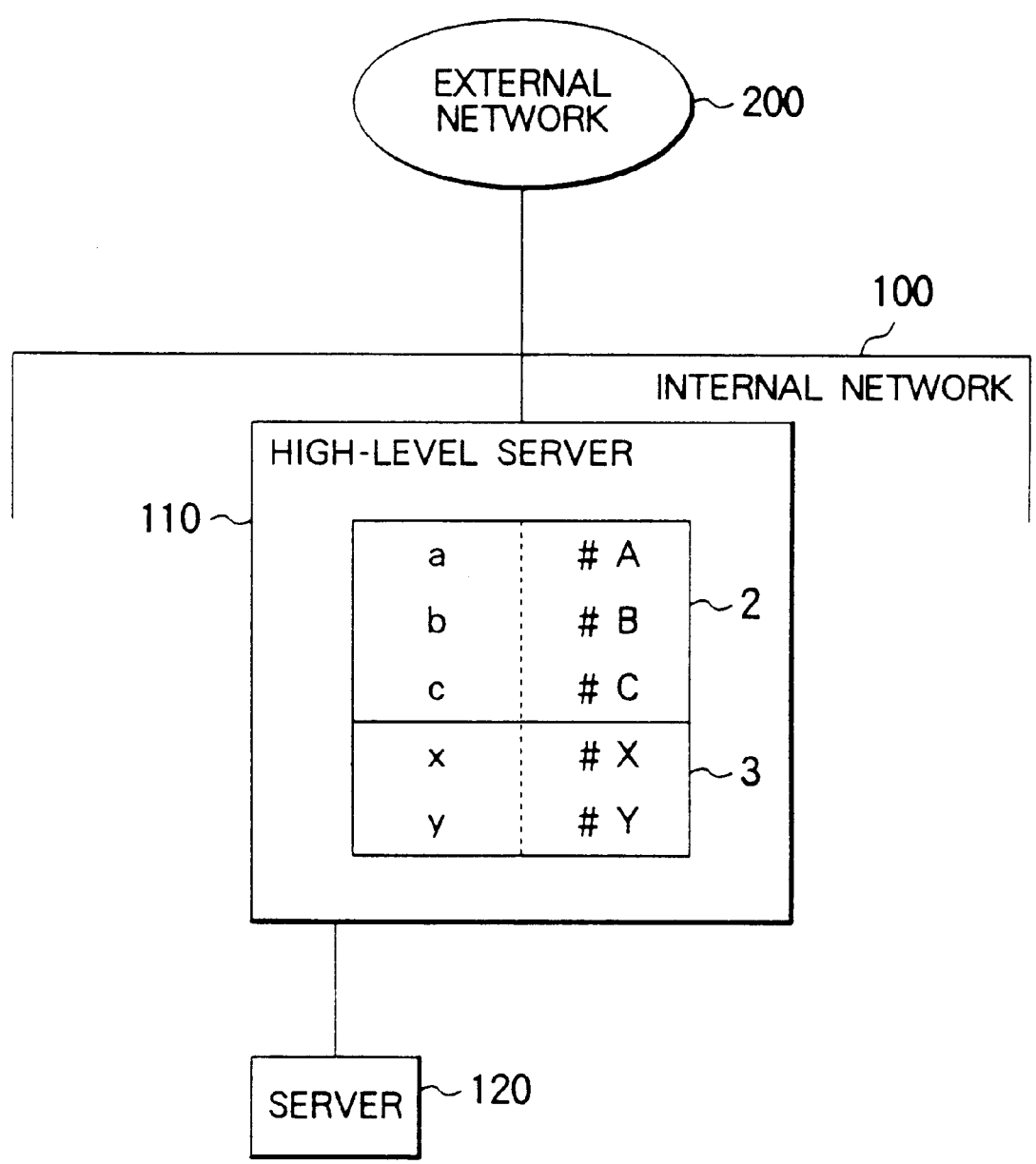
FIG. 1 is a principle/structure diagram of a first embodiment of the present invention.

FIG. 1 is a principle/structure diagram of a first embodiment of the present invention showing the configuration of an information reception and delivery system (or a network operating system) according to the present invention. The information reception and delivery system receives and delivers private information belonging to an internal network 100 and global information belonging to an external network 200 connected to the internal network 100. The information reception and delivery system comprises a given high-level server 110 which is provided within the internal network 100 and in which a global directory table 2 and a private directory table 3 are provided. The global directory table 2 comprises sources (or servers) of information and reception information used for receiving the information and retains the global information. The private directory table 3 comprises sources of information and information used for receiving the information and retains the private information. Through use the global directory table 2 and the private directory table 3, the predetermined high-order server 110 manages reception and delivery performed by another server 120 provided in the internal network 100.

Figure 2:
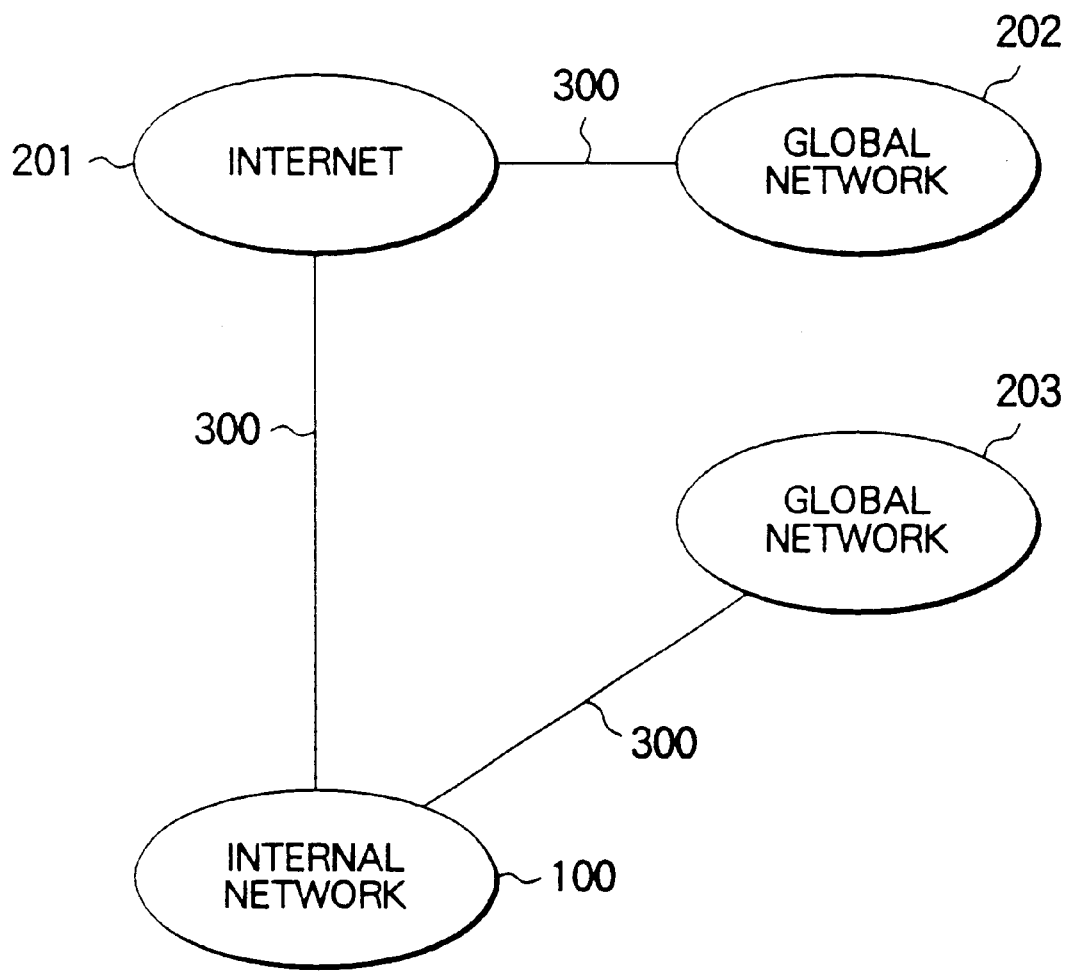
FIG. 2 is a structural diagram of an information reception and delivery system.
Figure 3:
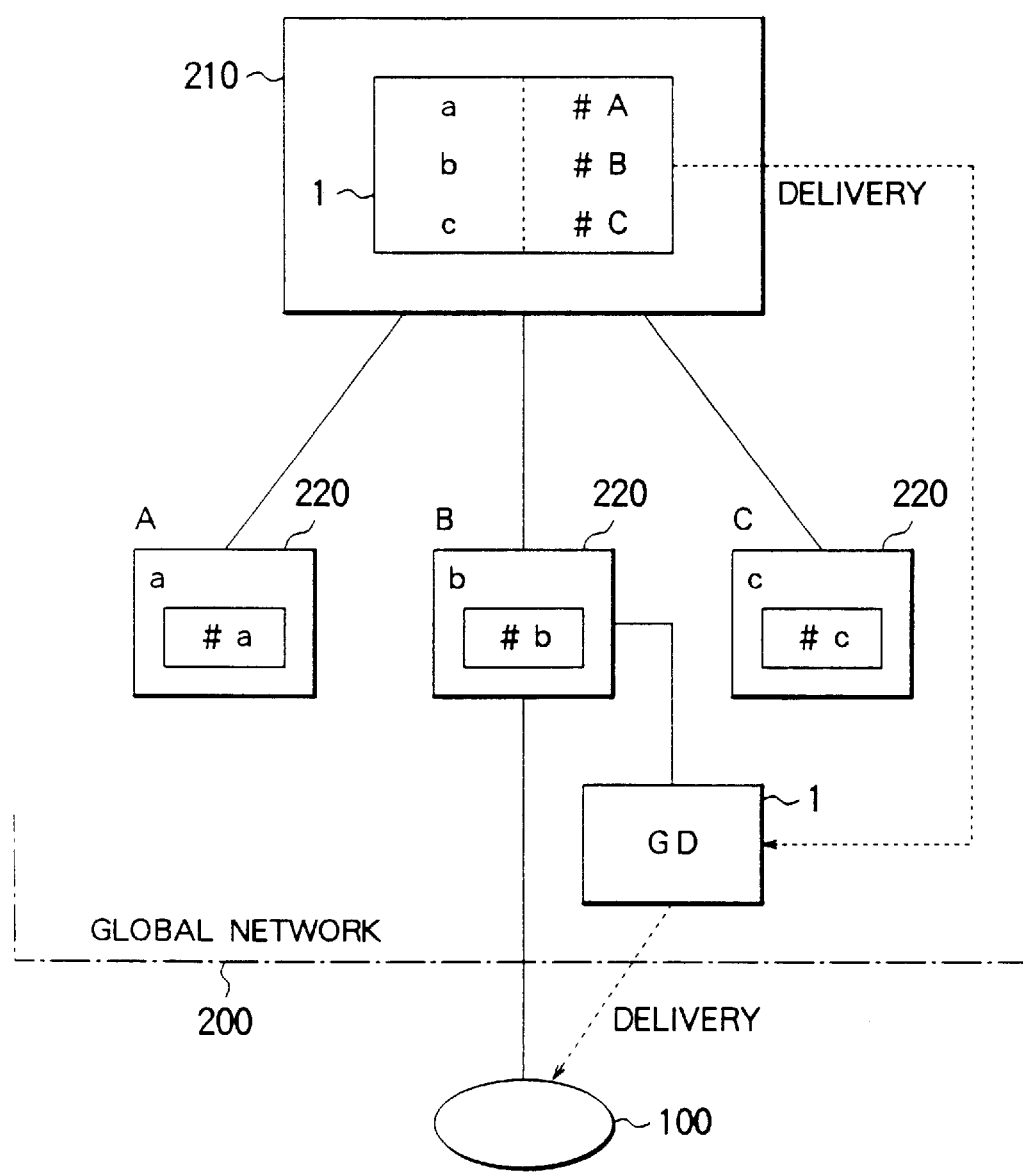
FIG. 3 is a structural diagram of an information reception and delivery system.
Figure 4:
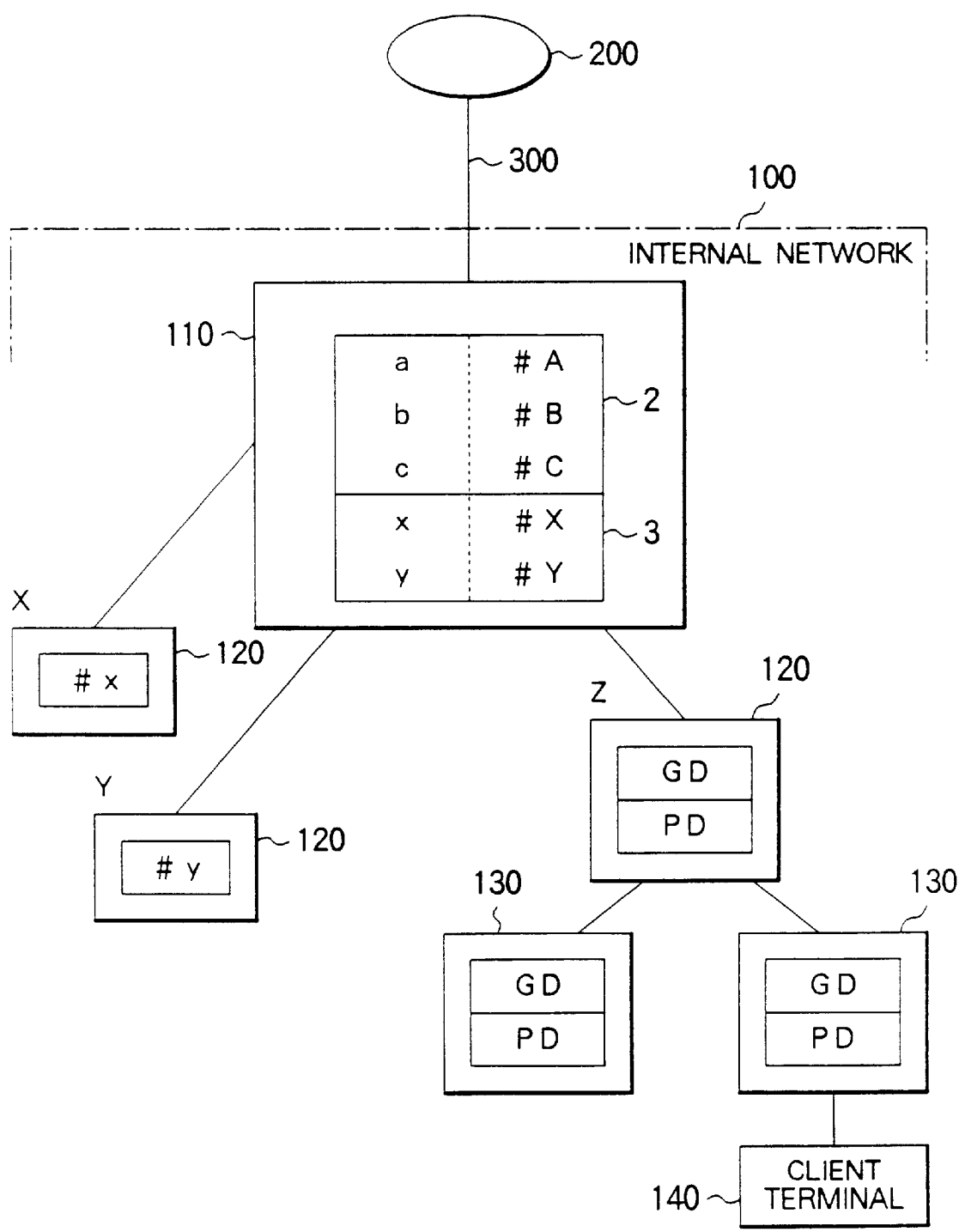
FIG. 4 is a structural diagram of an information reception and delivery system.
Figure 5:
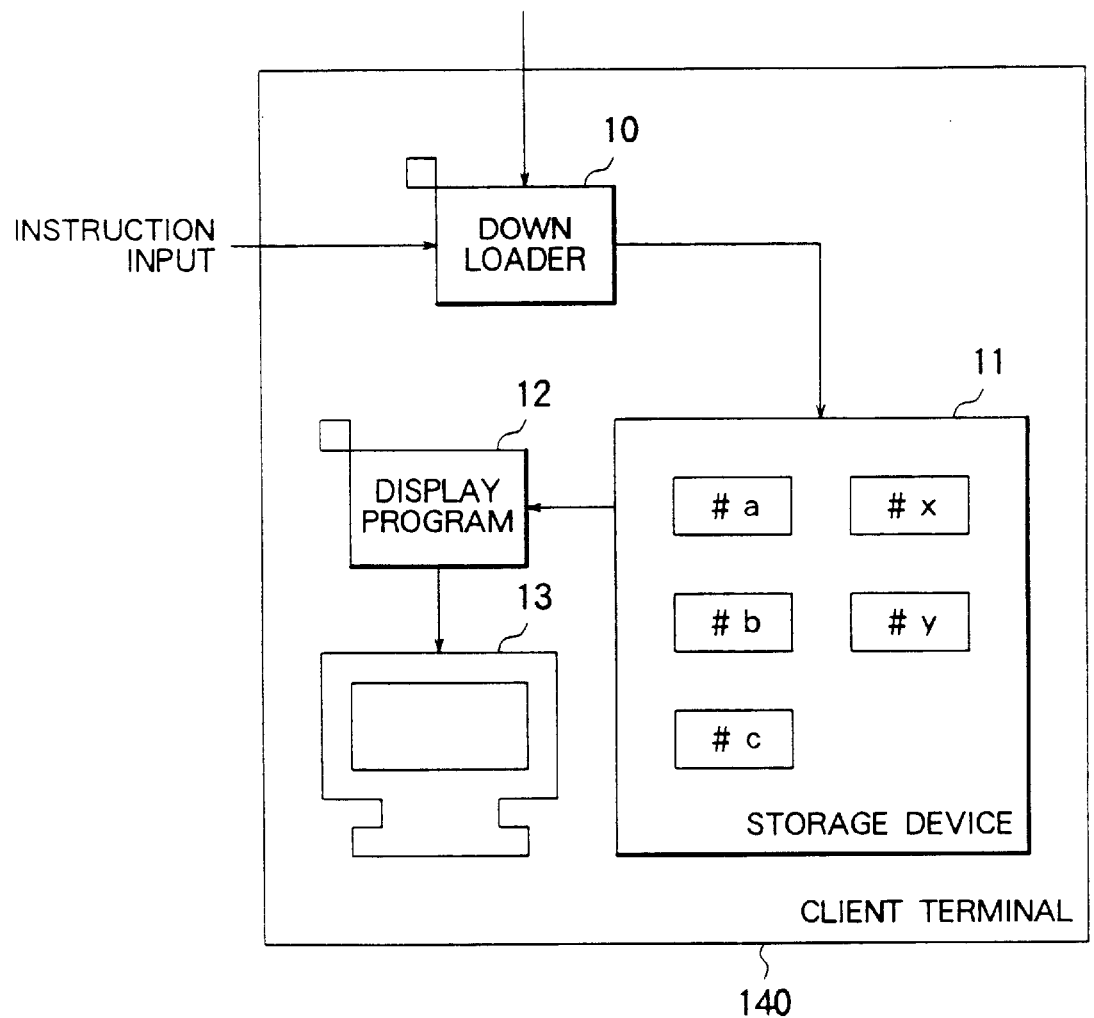
FIG. 5 is a structural diagram of an information reception and delivery system.

FIGS. 2 through 5 show the configuration of the information reception and delivery system according to the present invention. Particularly, FIG. 2 shows connections among networks, and FIG. 3 shows the configuration of the external (or shared) network (or global network) 200. FIG. 4 shows the configuration of the internal network 100 (or private network or LAN), and FIG. 5 shows the configuration of a terminal (client terminal) 140 of the internal network 100.

As shown in FIG. 2, the internal network 100, such as an intranet, is connected to Internet 201—which is the external network 200—over a line 300 such as a public line or a private line and receives and delivers information. A global network 202—which is another external network 200—is connected to the Internet 201 and receives and delivers information. Accordingly, the internal network 100 is also connected to the global network 202 by way of the Internet 201 and receives and delivers information. Although the global network 202 can be connected to the internal network 100 by way of the Internet 201, there may be a case where the internal network 100 is directly connected to a global network 203—which is still another external network—by way of the line 300 and receives or delivers information. This information is public information, e.g., newspaper stories.

Accordingly, the internal network 100 receives and delivers information from the Internet 201, information from the global network 202, and information from the global network 203. Since these information items are prepared outside the internal network 100, they are global information for the internal network 100. Further, within the internal network 100, information produced and supplied from within the internal network 100 is received and delivered. Accordingly, such information is private information for the internal network 100.

As shown in FIG. 3, the external network 200 such as the Internet 201 and the global networks 202, 203 contain a global directory server 210 corresponding to a high-level server and global servers 220 corresponding to low-level (or intermediate-level) servers. The global directory server 210 is a first-level (or highest-level) server for managing directories, and the global servers 220 are second-level servers for managing directories. Although not shown in the drawings, further lower-level servers and client terminals are connected to the global servers 220.

A global server A, which is one of the global servers 220 (the same applies to global servers B and C), prepares information (global information) including material (archive) "a" and content information regarding the contents of the material or attribute information (content item) and stores the thus-prepared information. The material is expressed as "Archive #a" and is assigned caption "Content item (or Global Content item) a." Accordingly, the global server A and others serve as news servers of, e.g., the Internet 201.

For example, Archive #a includes "news stories of newspaper A" prepared and opened by a newspaper company. The content item "a" of Archive #a is conceivably "News stories of newspaper A" straightforwardly representing the contents of Archive #a. In such a case, the global server A corresponds to the global server 220 of the newspaper company.

If a system manager of the global server A determines that content item "a" (that is, an archive #a) may be opened, the global server A prepares a directory (or content item directory) "#A" with regard to an archive #A in response to an instruction input by the system manager. The thus-prepared directory #A is uploaded to the global directory server 210 together with its content items "a." A directory is always uploaded together with its content item. The same applies to the following descriptions. The archive #a still remains in the global server A.

The directory of the archive #a comprises the global server A which is the source of the archive and reception information used for receiving the archive #a. More specifically, the directory is an address (including a network or IP address, etc.) or ID of the global server A. The address or ID is expressed as #A. When viewed from the internal network 100, the directory corresponds to a directory (e.g., a global directory) regarding the global information.

The global directory server 210 is equipped with a directory table 1 having a predetermined format. The global directory server 210 stores into the directory table 1 the directory #A of content item "a" uploaded by the global server A. The directory #A is registered together with the name of content item, i.e., the content item "a." In short, directory table information (i.e., the directory #A with the name of content item "a") to be stored in the directory table 1 is prepared and stored. Similarly, directory #B uploaded from the global server B and directory #C uploaded from the global server C are stored into the directory table 1. Further, even with regard to the archive prepared by the global directory server 210 itself, the directory of this archive may be stored into the directory table 1.

Every time the global directory server 210 performs preparation and updating operations (or at predetermined time intervals), the directory table 1 prepared by the global directory server 210 is delivered to the global servers A through C. Since the information regarding the directory table 1 is public information, delivery of the information results in no problems. Accordingly, the global servers A through C, which have received the directory table 1, deliver the directory table 1 to further lower servers or servers in another network.

As shown in FIG. 4, the internal network 100, such as an intranet, employs a treelike (hierarchical) configuration and comprises a private directory server 110 corresponding to a high-level server, private servers (or intra-net servers) 120 corresponding to intermediate servers, private servers 130 corresponding to low-level servers, and the client terminal 140 which is connected to and lower than the private server 130. The private directory server 110 is a first-level (or the highest-level) server or terminal (or host computer) for directly management in the internal network 100. The private servers 120 and 130 are respectively the second- and third-level servers or terminals for directly management. The client terminal 140 is a fourth-level (e.g., the lowest-level) terminal for directly management.

The private directory server 110 that is the top of the internal network 100 receives the directory table 1 delivered from the external network 200 over the line 300 in the manner as mentioned previously and downloads the thus-received directory table 1 into a global directory table (GD) 2. More specifically, the private directory server 110 receives the directory table 1 as the global directory table 2 of its own. To this end, the private directory server 110 is equipped with the global directory network 2 having a predetermined format. The global directory table 2 is identical in format with the directory table 1.

Here, the private directory server 110 may receive the directory table 1 from any server of the external network 200. For example, the private directory server 110 may receive the directory table 1 directly from the global directory server 210 or from the global server B (shown in FIG. 3). Accordingly, the private directory server 110 also serves as a WWW browser for use with the Internet 201.

Even within the internal network 100, a private server X (the same applies to private servers Y and Z)—which is one of the private servers 120—prepares information (private information) regarding material "archive #x" and contents information and stores the thus-prepared information. The content item is expressed as "content item (or private content item) x." If a system manager of the private server X (or the internal network 100) considers that the content item "x" may be opened, the private server X prepares a directory #X for the archive #x and uploads the directory #X to the private directory server 110 together with the content item "x" in response to an instruction entered by way of the system manager.

The directory of the content item "x" comprises the private server X which is the source of the content item and reception information used for receiving the archive #x. More specifically, the directory is an address, ID, or the like of the global server X. The address, ID, or the like is expressed as #X. When viewed from the internal network 100, the directory corresponds to a directory (e.g., a private directory) regarding the private information.

The private directory server 110 is equipped with a directory table (PD) 3 having a predetermined format. The private directory table 3 has the same format as that of the global directory table 2 or directory table 1. Accordingly, the directory #X is stored into the private directory table 3, as is the directory #A. In short, directory table information used for storage is prepared and stored. Similarly, directory #Y uploaded from the private server Y is also stored into the private directory table 3. Further, even with regard to the archive prepared by the private server 130 or by the private directory server 110 itself, the directory of this archive may be stored into the private directory table 3.

Every time the private directory server 110 prepares, updates, or receives the global directory table 2 or the private directory table 3 (or at predetermined time intervals), the global directory table 2 received by the private directory server 110 and the private directory table 3 prepared by the same are delivered to the private servers X through Z. Since the information regarding the global directory table 2 is public information, delivery of the information results in no problems. Further, the information regarding the private directory table 3 will in principle pose no problem, so long as the information is delivered within the corporation. Accordingly, the private servers X through Z, which have received the delivery of the global directory table 2 and the private directory table 3, deliver these directory tables to the private servers 130 and the client terminal 140, both being lower than the private servers X through Z.

As shown in FIG. 5, the client terminal 140 has means for browsing the global directory table 2 and the private directory table 3 delivered to the user of the terminal. Because of such means, when the user of the client terminal 140 wishes to browse a certain information item (i.e., an archive), the user instructs fetching of an archive by specifying a global directory and/or a private directory within the global directory table 2 and/or the private directory table 3. In response to the entry of such an instruction, a downloader 10 of the client terminal 140 downloads the archive #a into a storage device 11 of the client terminal 140 from the global servers 210, 220 and/or the private servers 110, 120, 130 by reference to the specified global directory and/or private directory.

A display program 12 of the client terminal 140 displays on a display 13 the archive #a thus downloaded into the storage device 11, whereby the user of the client terminal 140 can look at the archive #a.

The information reception and delivery system according to the present invention manages in detail the delivery of the global directory table 2 and the private directory table 3 received from the private directory server 110, that is, the delivery of directories. Through such a detailed management of delivery of directories, the reception of archives is also managed in detail.

Figure 6:
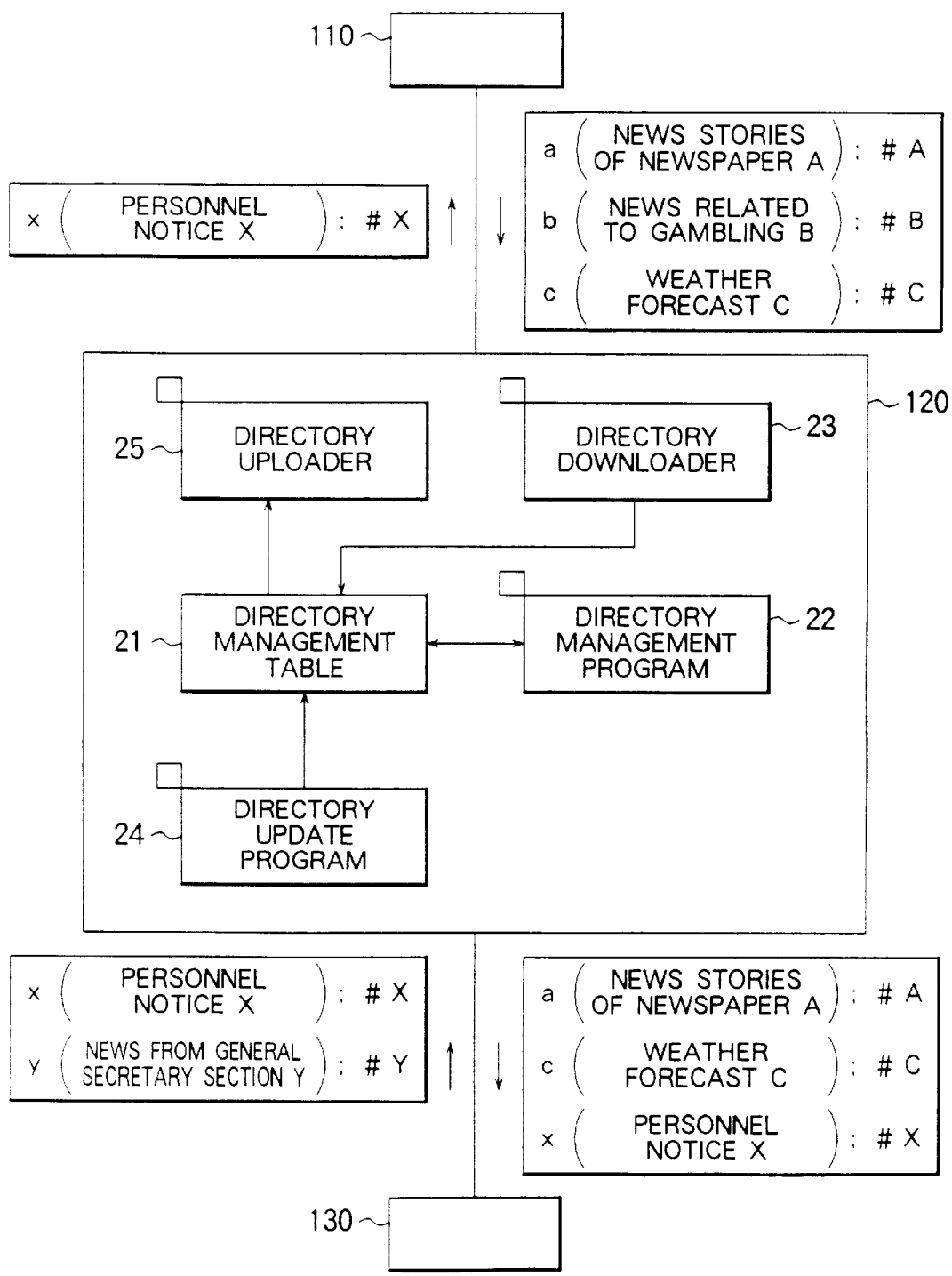
FIG. 6 is an explanatory diagram for describing the management of directories.
Figure 8:
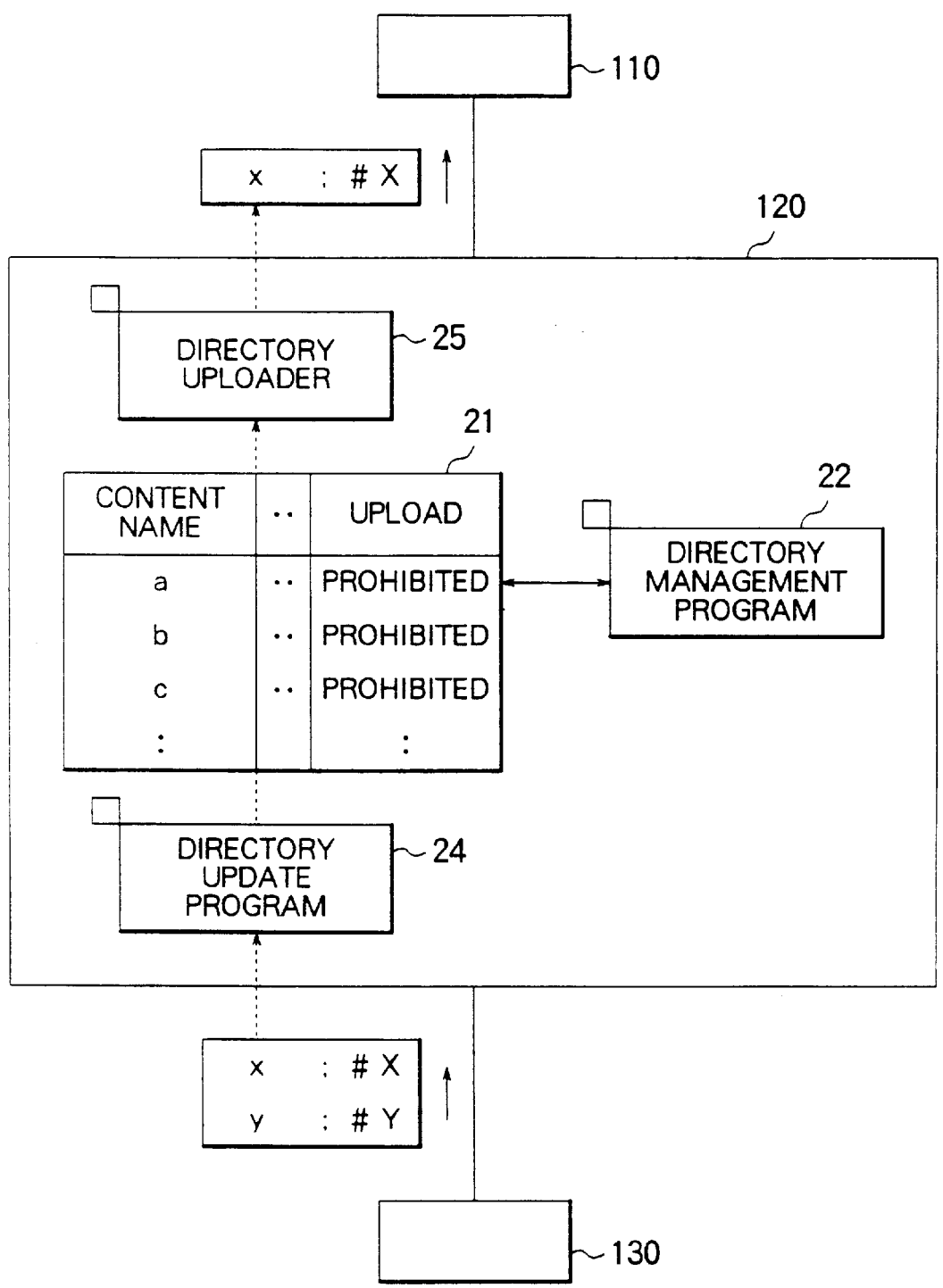
FIG. 8 is an explanatory diagram for describing uploading of the directory.
Figure 9:
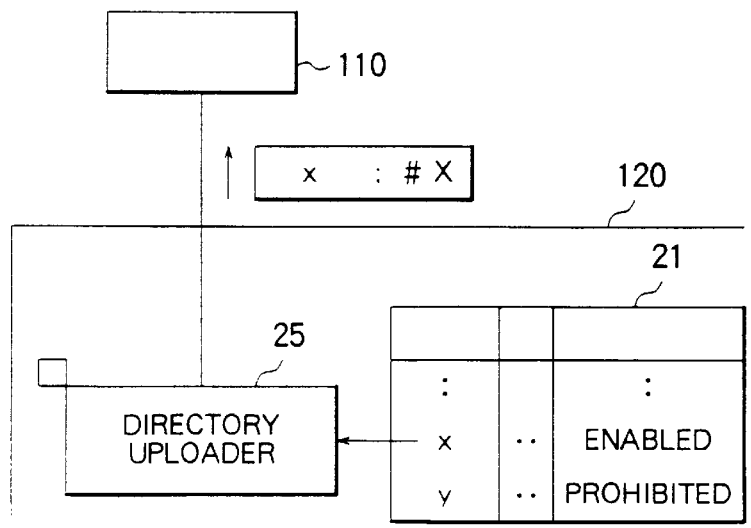
FIG. 9 is an explanatory diagram for describing the uploading of the directory.
Figure 10:
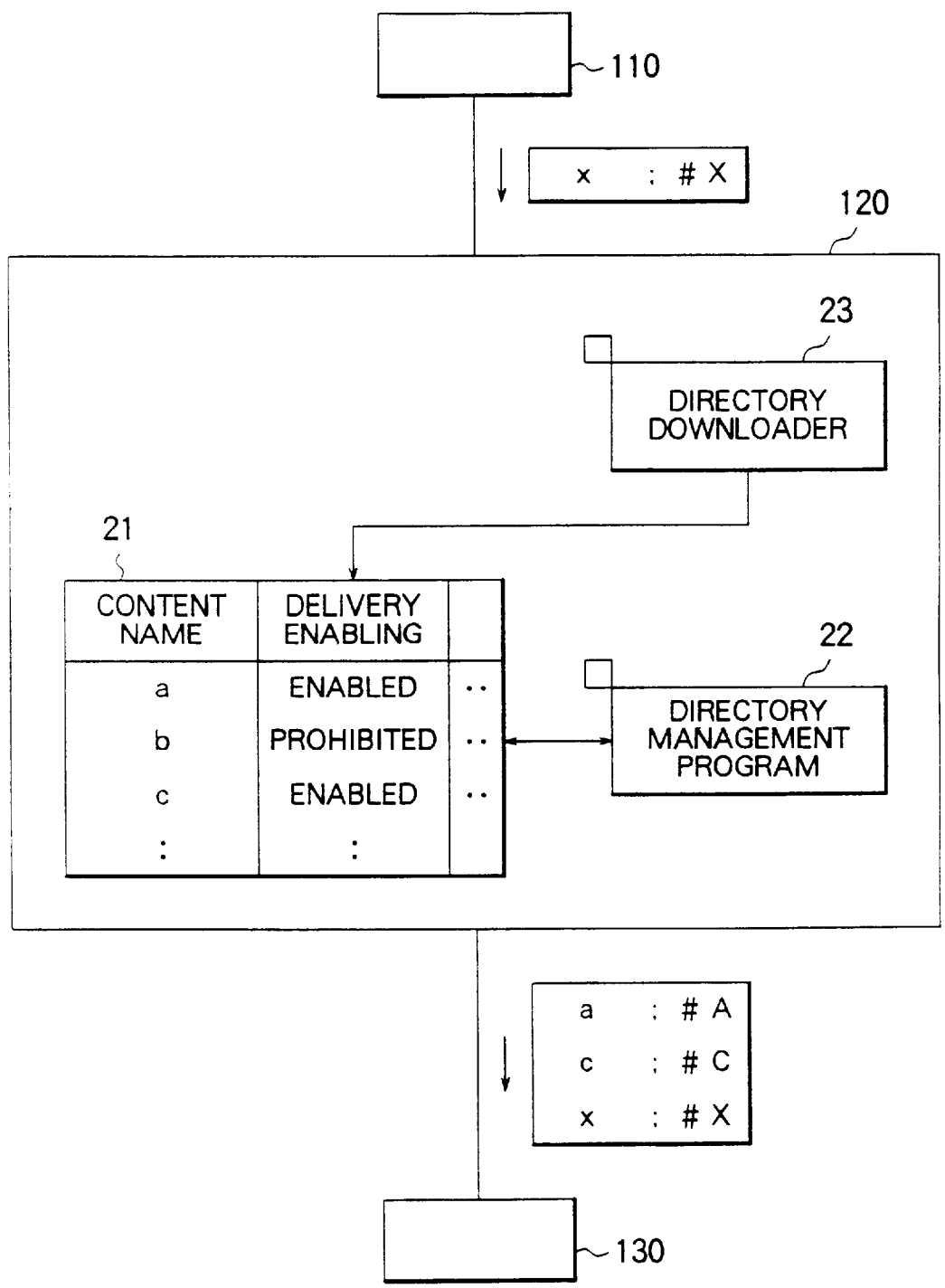
FIG. 10 is an explanatory diagram for describing downloading of the directory.

FIGS. 6 through 11 show the management of directories. Particularly, FIG. 6 shows the configuration of a server of the internal network 100, e.g., that of the private (or intranet) server 120 corresponding to an intermediate server. FIG. 7 shows the configuration of a directory management table of the intra-net server 120, and FIGS. 8 and 9 show the uploading of a directory. FIGS. 10 and 11 show the downloading of a directory.

The following description explains the configuration of the intra-net server 120, and the private directory server 110 and the private server 130 are identical in configuration with the intra-net server 120. By virtue of such a configuration, information can be managed in accordance with each hierarchy of the internal network 100. In another server, such a configuration may be omitted, as required.

As shown in FIG. 6, the intra-net server 120 comprises a directory management table 21, a directory management program 22, a directory downloader 23, a directory update program 24, and a directory uploader 25.

Further, as shown in FIG. 7, the directory management table 21 stores a delivery enabling flag and an upload enabling flag for each name of the content item (or for each information item). The delivery enabling flag represents whether the delivery of a directory from a high-level server (e.g., the private directory server 110) to a low-level server (e.g., the private server 130) is enabled or prohibited. The upload enabling flag represents whether or not the delivery of a directory from a low-level server (e.g., the private server 130) to a high-level server (e.g., the private directory server 110) is enabled or disabled. Accordingly, the directory management table 21 of the intra-net server 120 (or the internal network 100) collectively manages the directories of content items that can be delivered to another server.

The directory management program 22 manages reception and delivery of directories performed by the private directory server 110 and the private server 130 with reference to the directory management table 21. More specifically, the directory management program 22 manages the delivery of directories to a low-level server from a high-level server and the uploading of directories from a low-level server to a high-level server, through use of the directory management table 21. Through management of the private directory server 110, other private servers 120 located in the same hierarchy are also managed with regard to the reception and delivery of those directories.

Because of such a configuration, prior to reception or delivery of directories, the directory management program 22 sets delivery enabling flags and upload enabling flags in the directory management table 21. The system manager of the intra-net server 120 (or the manager of the internal network 100) sets these flags through interaction with the directory management program 22.

For example, as shown in FIG. 7, assume that the content item "a" is "news stories of a newspaper company A" delivered from the Internet 201. Since the content item "a" is beneficial to an employee, the delivery enabling flag is set to "enabled." In contrast, since the content item is delivered from a high-level server, the upload enabling flag is set to "upload prohibited." Further, assume that the content item "b" is "news related to gambling B" delivered from the Internet 201. Since the content item "b" is irrelevant to the business of the corporation, the delivery enabling flag is set to "disable." In contrast, since the content item is delivered from a high-level server, the upload enabling flag is also set to "upload prohibited."

Further, assume that the content item "x" is "personnel notice X" uploaded from a low-level server (e.g., the client terminal 140). To inform the employees of the content item "x," the delivery enabling flag is set to "enabled." For analogous reasons, the upload enabling flag is set to "upload enabled." Assume that the content item "y" is "news Y from a general affairs section" uploaded from a low-level server (e.g., the client terminal 140). Since the content item "y" is irrelevant to the employees other than the staff of the general affairs section, the delivery enabling flag is set to "prohibited." For analogous reasons, the upload enabling flag is set to "upload prohibited."

The directory downloader 23 downloads the global directory and the private directory delivered to a high-level server, i.e., the private directory server 110, into the intra-net server 120. On the basis of this downloading operation, the contents of the directory management table 21 is updated. If the directory is for a new content item, the directory is added to the directory management table 21. In contrast, if the directory is modified, the corresponding existing directory is modified. For example, as shown in FIGS. 6 and 7, the directory downloader 23 enters the directories "a" to "c" into the directory management table 21.

The directory—whose delivery enabling flag is set to enabled in the directory management table 21—is downloaded into a low-level server (e.g., the private server 130) by means of the directory downloader 23 of the private server 130 in the same manner. For example, as shown in FIGS. 6 and 7, the directory downloader 23 of a low-level server downloads the directories of the content items "a," "c," and "x."

The directory update program 24 retains in the intra-net server 120 the private directory uploaded from the private server 130 serving as a low-level server, by means of the directory uploader 25 of the private server. On the basis of the thus-retained private directory, the contents of the directory management table 21 are updated in a manner analogous to that mentioned previously. For example, as shown in FIGS. 6 and 7, the directories of the content items "x" and "y" are entered into the directory management table 21 by means of the directory update program 24.

The directory uploader 25 extracts content items—whose upload enabling flags are set to "upload enabled"—from among the content items entered into the directory management table 21. The thus-extracted content items are uploaded to a high-level server, i.e., the private directory server 110. For example, as shown in FIGS. 6 and 7, the directory of the content item "x" is uploaded from the directory management table 21 to a high-level server by means of the directory uploader 25.

Next, the uploading of a directory from a low-level server to a high-level server will be described in detail by reference to FIGS. 8 and 9. An explanation will now be given of a case in which the directory of the new content item "x" is uploaded to the intra-net server 120 and the private directory server 110 from the private server 130 serving as a low-level server.

Prior to uploading the directory, the directories of the content items "a" to "c" are already downloaded into the intra-net server 120 from the private directory server 110 serving as a high-level server. Since there directories are downloaded from a high-level server, the upload enabling flags of these directories are set to "prohibited" in the directory management table 21.

In this state, of the content items entered into the directory management table 21 of the private serer 130, the directories of the content items "x" and "y" whose upload enabling flags are set to "upload enabled" are uploaded by means of the directory uploader 25 of the private server 130. As shown in FIG. 9A, the directory update program 24 adds the names of the new content items "x" and "y" (and their directories) to the directory management table 21 and sets the upload enabling flags of these content items to "upload prohibited." Accordingly, the initial value of the upload enabling flag is always set to "prohibited." As a result, new directories can be prevented from being delivered before they are checked by the system manager.

After the directory management table 21 has been updated, the update of the management able is displayed on a display of the intra-net server 120. Upon viewing the update indication, the system manager becomes aware of the content item "x" being "personnel notice X" and a necessity of informing the employees of the content item "x."As shown in FIG. 9B, the system manager sets the upload enabling flag of the content item "x" to "enabled" through interaction with the directory management program 22. In contrast, when the system manager becomes aware of the content item "y" being "news Y from the general affair section" and no need to notify the content item to the employees other than the staff of the general affair section, the system manager sets the upload enabling flag of the content item "y" to "prohibited" through interaction with the directory management program 22.

As a result, as shown in FIG. 9C, solely the directory #X of the new content item "x" is uploaded to the private directory server 110 by means of the directory uploader 25 of the intra-net server 120.

Next, the downloading of a directory from a high-level server to a low-level server will be described in detail by reference to FIGS. 10 and 11. An explanation will now be given of the case shown in FIG. 10 in which the directory of the new content item "x" is newly downloaded into the intra-net server 120 and the private server 130 from the private directory server 110 serving as a high-level server.

Prior to downloading the directory, the directories of the content items "a" to "c"are already downloaded into the private server 130 from the intra-net server 120 serving as a high-level server. More specifically, the directory whose delivery enabling flag is set to "enabled" in the directory management table 21 (consequently, the directory of the content item "b" is excluded) is downloaded into the private server 130 by means of the directory downloader 23 of the private server 130.

In this state, a directory (contents name "x") whose deliver enabling flag is set to "enabled" in the directory management table 21 of the private directory server 110 corresponding to a high-level server is downloaded into the intra-net server 120 by means of the directory downloader 23 of the intra-net server 120. As shown in FIG. 11A, the directory downloader 23 adds the name of the new content item "x" to the directory management table 21 and sets the deliver enabling flag of the content item to "upload prohibited." Accordingly, the initial value of the upload enabling flag is always set to "prohibited." As a result, new directories can be prevented from being delivered before they are checked by the system manager.

After the directory management table 21 has been updated, the update of the management able is displayed on a display of the intra-net server 120. Upon viewing the update indication, the system manager becomes aware of the content item "x" being "personnel notice X" and a necessity of informing the employees of the content item "x." As shown in FIG. 11B, the system manager sets the upload enabling flag of the content item "x" to "enabled" through interaction with the directory management program 22.

As a result, as shown in FIG. 11C, solely the directory #X of the new content item "x" is downloaded into the private server 130 by means of the directory downloader 23 of the private server 130, as in the case of the directories of the content items "a" and "c."

In the information reception and delivery system according to the present invention, the retention of an archive (contents of information) referred to by the client terminal 140 in a manner as mentioned previously is managed in more detail. For example, of information items opened in the external network 200, an archive of a certain information item which is frequently referred to is mirrored (or copied) to a suitable server within the internal network 100, and reference is made to this archive. As a result, a rate of occupation of the line 300 (or an extent of occupation of the line or a time during which the line is occupied) can be reduced, thus diminishing the time required to transmit the archive and enabling quick reference to the archive.

Figure 12:
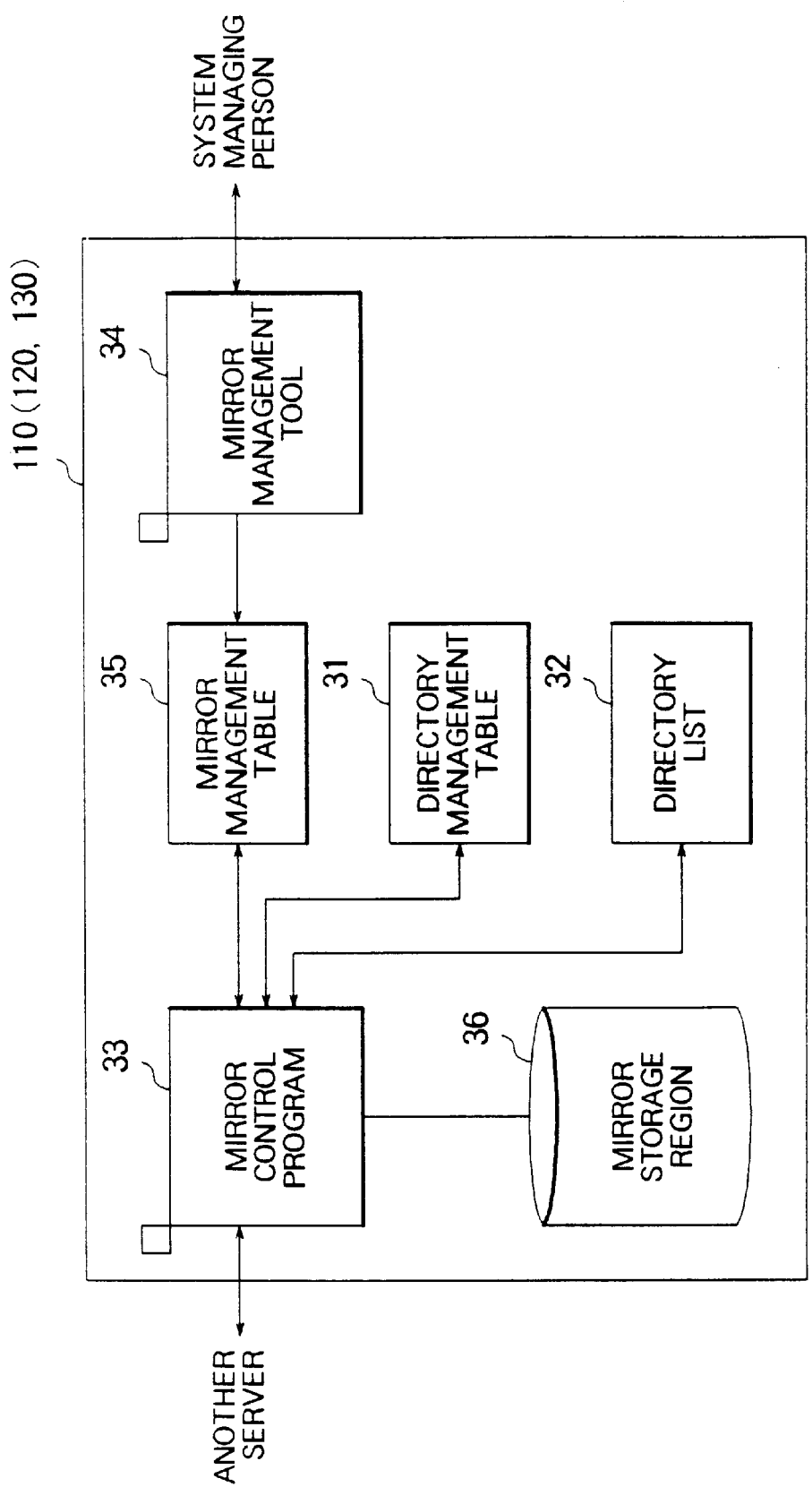
FIG. 12 is an explanatory diagram for describing a mirroring operation.
Figure 13:
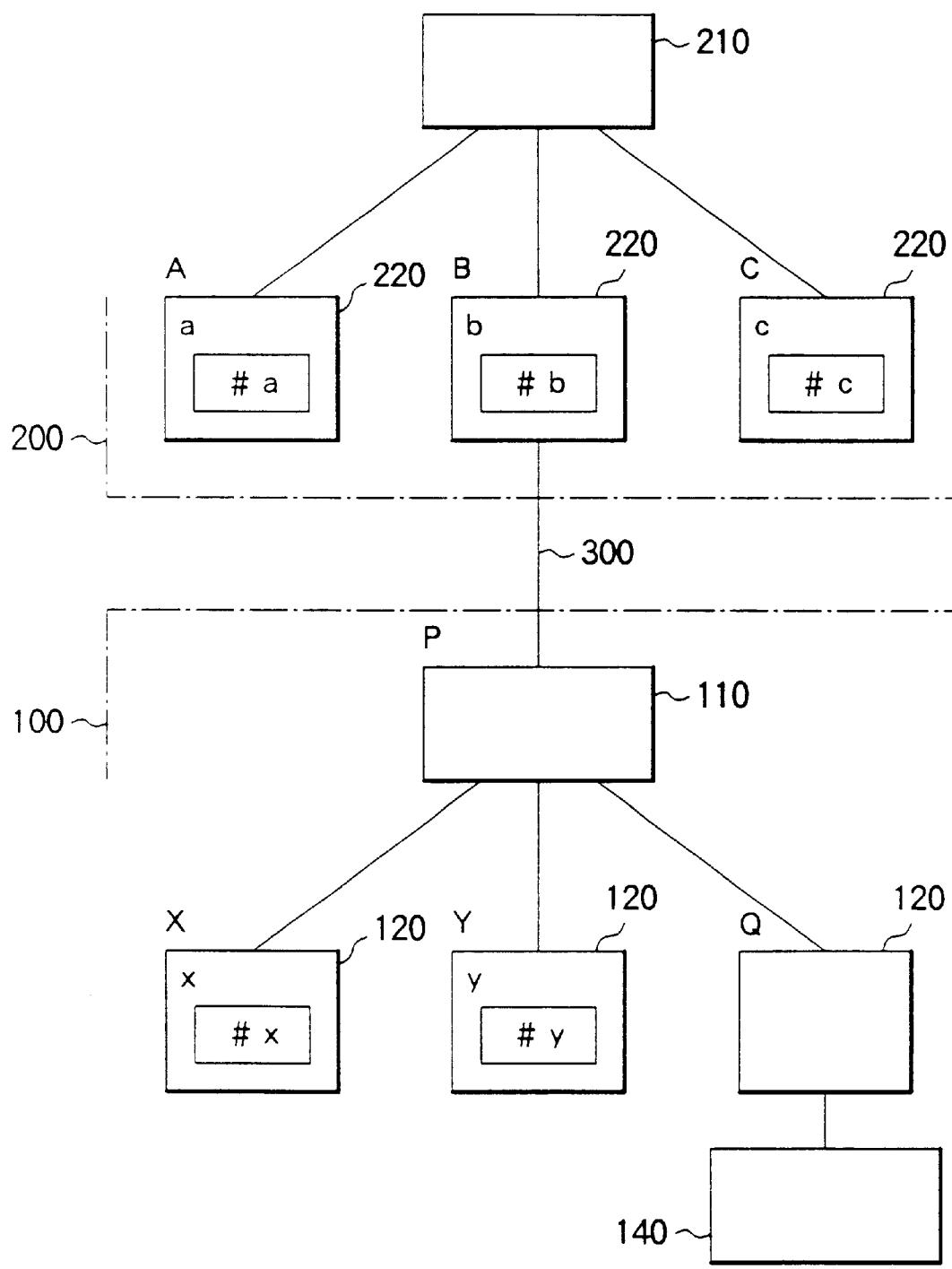
FIG. 13 is an explanatory diagram for describing the mirroring operation.
Figure 14:
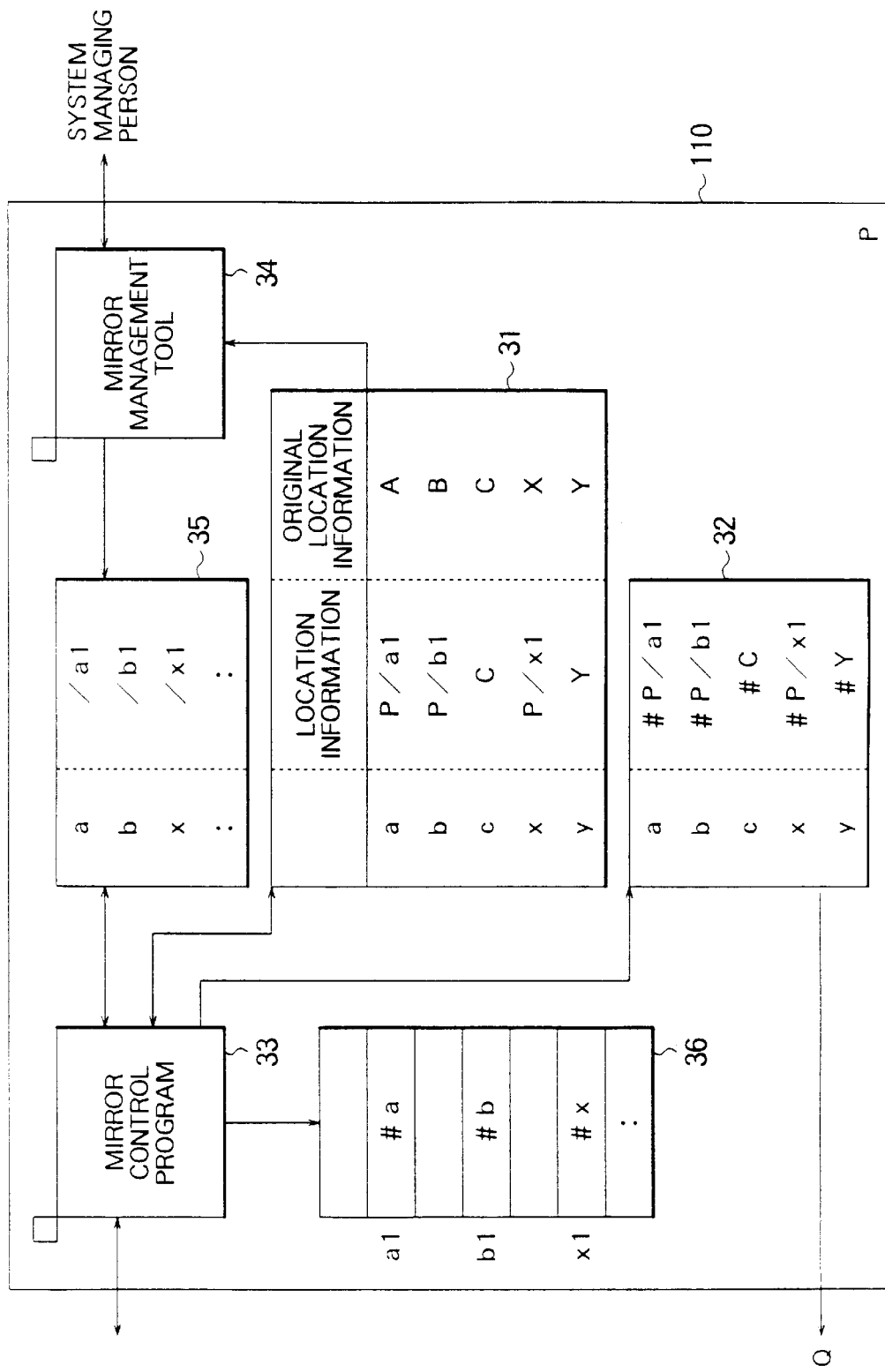
FIG. 14 is an explanatory diagram for describing the mirroring operation.
Figure 15:
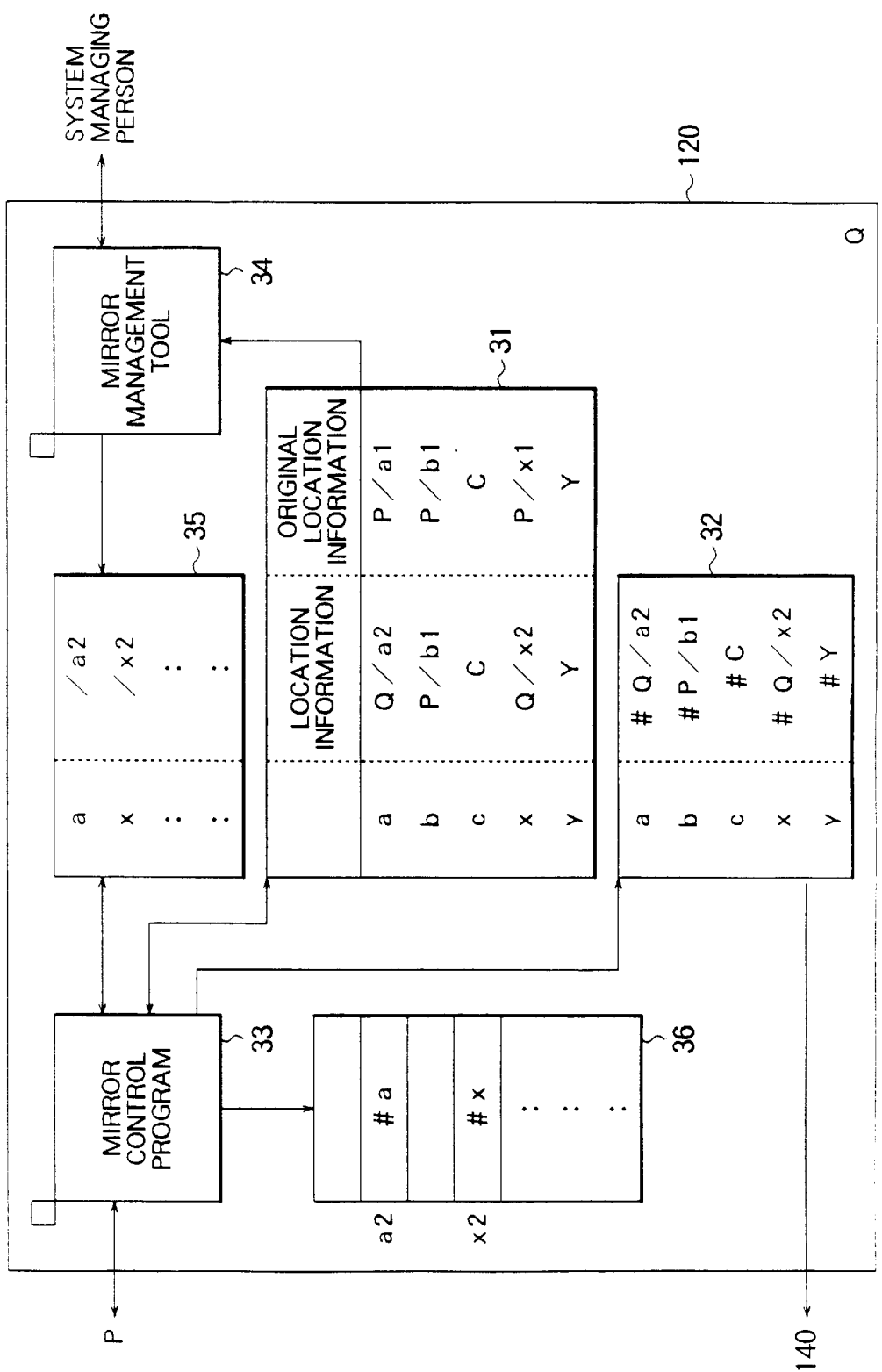
FIG. 15 is an explanatory diagram for describing the mirroring operation.
Figure 16:
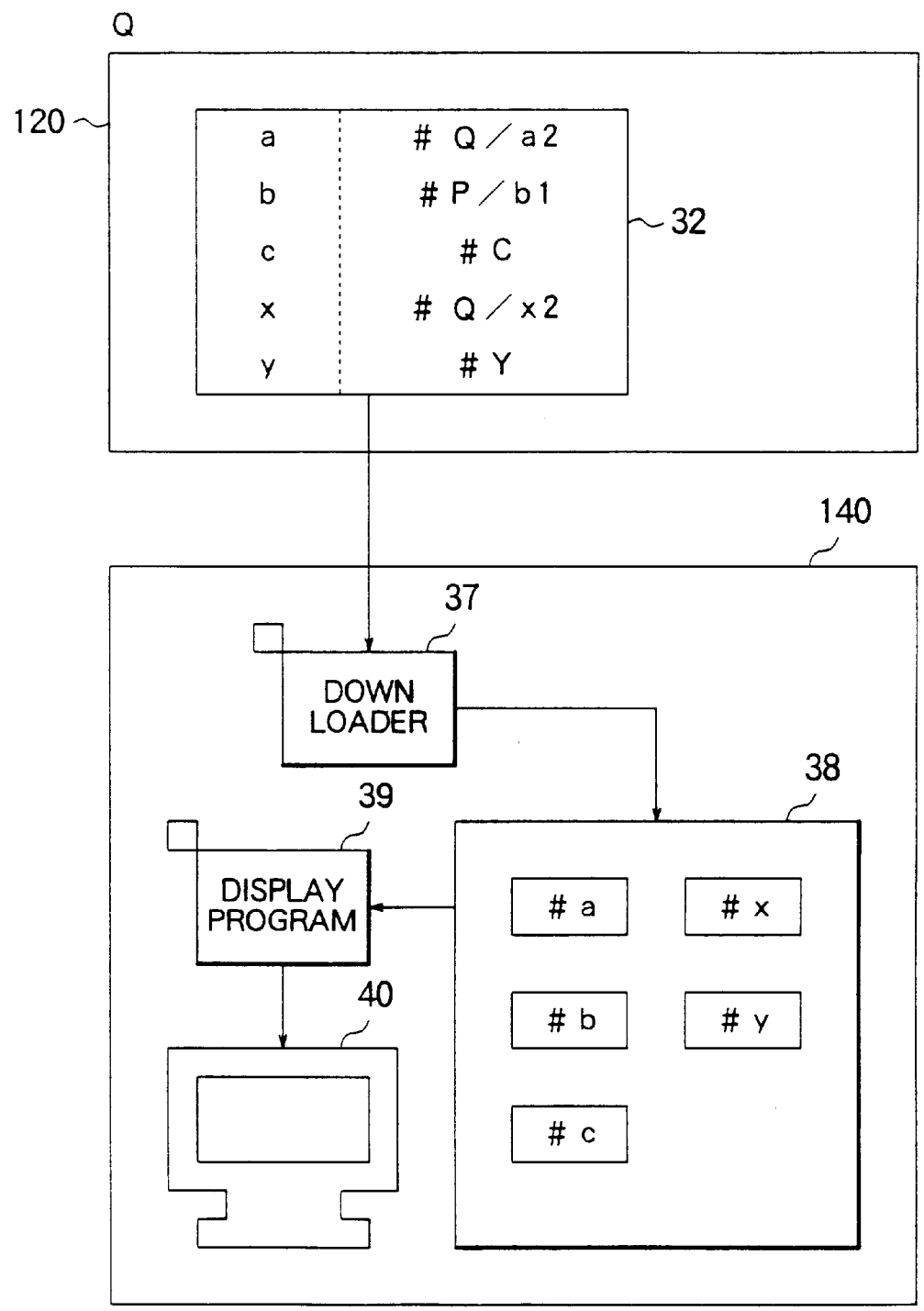
FIG. 16 is an explanatory diagram for describing the mirroring operation.

FIGS. 12 through 16 shows a mirroring operation for the purpose of retaining an archive. Particularly, FIG. 12 shows a configuration for a mirroring operation used for the servers 110, 120, and 130 of the internal network 100. FIG. 13 shows the retention of an archive in the external network 200 and the internal network 100. FIGS. 14 through 16 show the retention of an archive in the internal network 100. Particularly, FIG. 14 shows the retention of an archive in the private directory server 110; FIG. 15 shows the retention of an archive in the private server 120; and FIG. 16 shows the retention of an archive in the client terminal 140.

As shown in FIG. 12, the private directory server 110 comprises a directory management table 31, a directory table 32, a mirror control program 33, a mirror management tool 34, a mirror management table 35, and a mirror storage region 36. Although the directory management table 31 is assigned another reference number for convenience, the table is common with the directory management table 21. The global directory table 2 and the private directory table 3 are integrally shown in the form of the directory table 32.

The directory management table 31 stores location information and original location information for each contents names (for each information item). The location information represents the location of an archive in order to provide the archive to a lower-level server. When the archive is mirrored into the server, a storage area of the mirror storage region 36 of the server is taken as location information. Accordingly, the location information represents, e.g., the location of the archive closest to the server. The original location information represents a server which is the original source of the archive. Therefore, the original location information is one delivered from the external network 200 or a high-level server.

The directory table 32 stores a newly-composed directory (i.e., a composite directory) for the content item that has been mirrored, instead of the original directory of the content item. As mentioned previously, the directory of, e.g., content item "a," comprises the global server A, which is the original source of the archive, and reception information used for receiving the archive #a. In contrast, a composite directory of, e.g., content item "a," comprises a server, which is the source of the content item located closest to the server, and reception information used for receiving the archive #a from the server. In short, the composite directory corresponds to location information, whereas the original directory corresponds to original location information.

The mirror control program 33 performs a mirroring operation by reference to the mirror management table 35. More specifically, the mirror control program 33 transfers files from the archive which is referred to. The files are transferred from the server—which is the source of the archive files—to a specified area in the mirror storage region 36 of the server where the mirror control program 33 exists. Further, the mirror control program 33 modifies the contents of the directory management table 31 and those of the directory table 32 through a mirroring operation. More specifically, location information is prepared with regard to the content item that has been mirrored, and the thus-prepared location information is written into the directory management table 31, thus creating a composite directory and writing this composite directory into the directory table 32.

The mirror management tool 34 manages and updates the mirror management table 35. In short, the mirror management tool 34 permits the system manager to register content items to be mirrored, mirroring conditions, and the storage location of an archive through interaction with the mirror management tool 34. As a result of such registration, content items to be mirrored, mirroring conditions, and the storage location of a mirrored archive are determined.

The mirror management table 35 stores content items to be mirrored, mirroring conditions, the storage location of an archive, processing results, or the like. Content items to be mirrored are specified on a per-archive basis. The mirroring conditions include, e.g., a time interval at which a mirroring operation is performed. Processing results include the time (i.e., the final mirroring time) at which the final mirroring operation is performed with respect to an archive. The final mirroring time is stored in the mirror control program 33. A predetermined area of the mirror storage region 36 is specified as the storage location of an archive on a per-archive basis.

The mirror storage region 36 is a given area of a storage device of the server. The archive mirrored for another server is stored in the mirror storage region. For example, there is prepared beforehand areas where a plurality of archives can be stored.

As shown in FIG. 13, the global server A disposed within the external network 200 prepares the archive #a and its content item "a" and stores them. The global server A is the original source of the archive #a. The global servers B and C also store archives #b and #c in the same manner as does the global server A. As mentioned previously, the archives #a to #c are opened. Further, the directory "#A" of the archive #a is uploaded and stored into the global directory server 210. However, the archive #a still exists in the global server A, which is the original source of the archive.

As shown in FIG. 13, the private server X disposed within the internal network 100 prepares the archive #x and its content item "x" and stores them. The private server X is the original source of the archive #x. The private server Y also stores an archive #y in the same manner as does the private server X. As mentioned previously, the directory "#X" of the archive #x is uploaded and stored into the private directory server 110. However, the archive #x still exists in the private server X, which is the original source of the archive.

Throughout the following descriptions, the private directory server 110 is expressed as server P, and one of the private servers 120 (exclusive of the private servers X and y) is expressed as server Q.

In this state, as shown in FIG. 14, the system manger of the server P selects desired content items—which are allowed to be delivered to the lower-level server Q from the server P—from the content items of the directory management table 31 as content items to be mirrored through interaction with the mirror management tool 34. The thus-selected content items are registered into the mirror management table 35 of the server P. At the same time, the system manager also registers for each archive the area in the mirror storage region 36 where the mirrored archive is stored. For example, as shown in FIG. 14, the content items "a," "b," and "x" are registered, and their addresses a1, b1, and x1 are registered as the locations where the content items are to be registered.

The interactive processing performed by the mirror management tool 34 will be described more specifically. First, a record corresponding to one content item is extracted by reference to the directory management table 31 (step 1). The thus-extracted record is displayed for the system manager, and the system manager is required to enter an instruction as to whether or not to mirror the archive of the displayed content items into the server (step 2). Next, with regard to the content items determined to be mirrored by means of the instruction input, the system manager is further required to specify a location where the archive, which has been mirrored, is stored (step 3). The content items to be mirrored and the storage location of the mirrored content items are added to the mirror management table 35 (or the table is updated) (step 4). Steps 1 through 4 are repeatedly performed with regard to the content items registered in the directory management table 31. Further, these steps may be repeatedly performed with regard to the content items that have been determined to be mirrored.

Aside from the foregoing operations, the system manager of the server P registers into the mirror management table 35 a time interval at which a mirroring operation is performed. The time interval between the mirroring operations may be specified over the entire mirroring operations or for each archive. The final mirroring time is set to an initial value (i.e., 0) for newly registered content item "a."

The mirror control program 33 performs a mirroring operation by reference to the mirror management table 35. In short, if a registered time interval between mirror processing operations has elapsed from the final mirroring time, the mirror control program 33 transfers the file of the archive of the registered content items. For example, as shown in FIG. 14, with regard to the registered content items "a," "b," and "x," the archives #a, #b, and #x are read from the global servers A, B and the private server X—which are the sources of the respective archive—by reference to the original location information registered in the directory management table 31. The thus-read archives are stored in addresses a1, b1, and x1 in the mirror storage region 36, respectively.

Subsequently, the mirror control program 33 prepares (or updates) location information for each mirrored content item in the directory management table 31 and stores the thus-prepared information into the directory management table 31. For example, as shown in FIG. 14, since the content items "a," "b," and "x" have been mirrored into addresses a1, b1, and x1 of the mirror storage region 36 of the server P, the location information is determined as P/a1, P/b1, and P/x1, respectively. The location information regarding the other content items "c" and "y" which have not been mirrored is made equal to the original location information. Mores specifically, the initial value of location information is the original location information and is updated every time a mirroring operation is performed.

The processing executed by the mirror control program 33 will be specifically described. First, a record corresponding to one content item is extracted by reference to the mirror management table 35 (step 1). Next, the original location information corresponding to the record extracted in step 1 is fetched from the directory management table 31 by searching the directory management table 31 through use of the contents name (step 2). An archive is downloaded into a given storage area of the server by reference to the original location information regarding the record fetched in step 2 (step 3). The downloaded archive is stored into the storage area specified by the record fetched in step 1 (step 4). The area where the archive is stored is written into the directory management table 31 as the location information regarding the record fetched in step 2 (step 5). Further, steps 1 through 5 are repeatedly performed with regard to the content items that have been registered in the mirror management table 35.

The mirror control program 35 updates a directory of the directory table 32 for each mirrored content and stores the thus-updated directory into the directory table 32. For example, as shown in FIG. 14, the directories of the content items "a," "b," and "x" are updated to #P/a1, #P/b1, and #P/x1. As a result, the content items are opened to lower-level servers, and the server P enables the lower-level servers to refer to an archive. The directories of other content items "c" and "y" which are not mirrored are left as they are.

As shown in FIG. 15, the directory downloader 23 of the lower-level server Q prepares the directory management table 31 of the server Q by reference to the directory management table 32 of the higher-level server P. At this point in time, the directory management table of the server Q has the same content items as those of the directory table 32 of the server P. Accordingly, the location information of the directory management table 31 of the server Q is equal in content with the directory table 32 of the server P.

Next, the system manger of the server Q selects desired content items from the content items of the directory management table 31 as content items to be mirrored through interaction with the mirror management tool 34 in a manner analogous to that mentioned previously. The thus-selected content items are registered into the mirror management table 35 of the server Q. For example, as shown in FIG. 15, the content items "a" and "x" are registered, and their addresses a2 and x2 are registered as the locations where the content items are to be registered.

As shown in FIG. 15, with regard to the registered content items "a" and "x," the mirror control program 33 of the server Q reds the archives #a and #x from the private server P which is the source of mirrored archives by reference to the original location information P/a1 and P/x1 of the directory management table 31. The thus-read archives are stored into the addresses a2 and x2 in the mirror storage region 36 of the server Q.

After that, as shown in FIG. 15, the location information of the content items a and x in the directory management table 31 is set to Q/a2 and Q/x2, respectively.

Subsequently, as shown in FIG. 15, the mirror control program 33 determines the directories of the content items "a" and "x" in the directory table 32 as #Q/a2 and #Q/x2. As a result, the content items are opened to a lower-level server, and the server Q enables lower-level serves to refer to the archive of the content items. Accordingly, the server Q provides the archives #a and #x to the server Q and lower-level servers (and the client terminals). The server P provides the archive #b, and the global server C provides the archive #c. Further, the private server Y provides the archive #y.

As shown in FIG. 16, the user of the client terminal 140 selects archives to be downloaded from the content items included in the directory table 32 by reference to the directory table 32 of the high-level server Q through interaction with the downloader 37. For example, the content items "a," "b," "c," "x," and "y" are selected.

With reference to the directory table 32 of the server Q, the downloader 37 downloads the archives #a and #x from the addresses a2 and x2 in the mirror storage region 36 of the server Q, the archive #b from the address b1 in the mirror storage region 36 of the server P, the archive #C from the global server C, and the archive #y from the private server Y. The thus-downloaded archives are stored in the archive storage region 38. At this time, the user of the client terminal 140 is not required to know that the archives are downloaded from which of the servers, nor is it impossible for him to know.

The archives downloaded into the archive storage region 38 are displayed on the display 40 of the client terminal 140 according to the display program 39. As a result, the user of the client terminal 140 can view the archives.

Although the present invention has been described with reference to the information reception and delivery system, the system may be written into a storage medium such as a flexible disk or CD-ROM in the form of information. Further, the system may be downloaded into a storage medium such as a hard disk. The system stored in any form should be construed as falling into the technical scope of the present invention.

Second Embodiment

Figure 17:
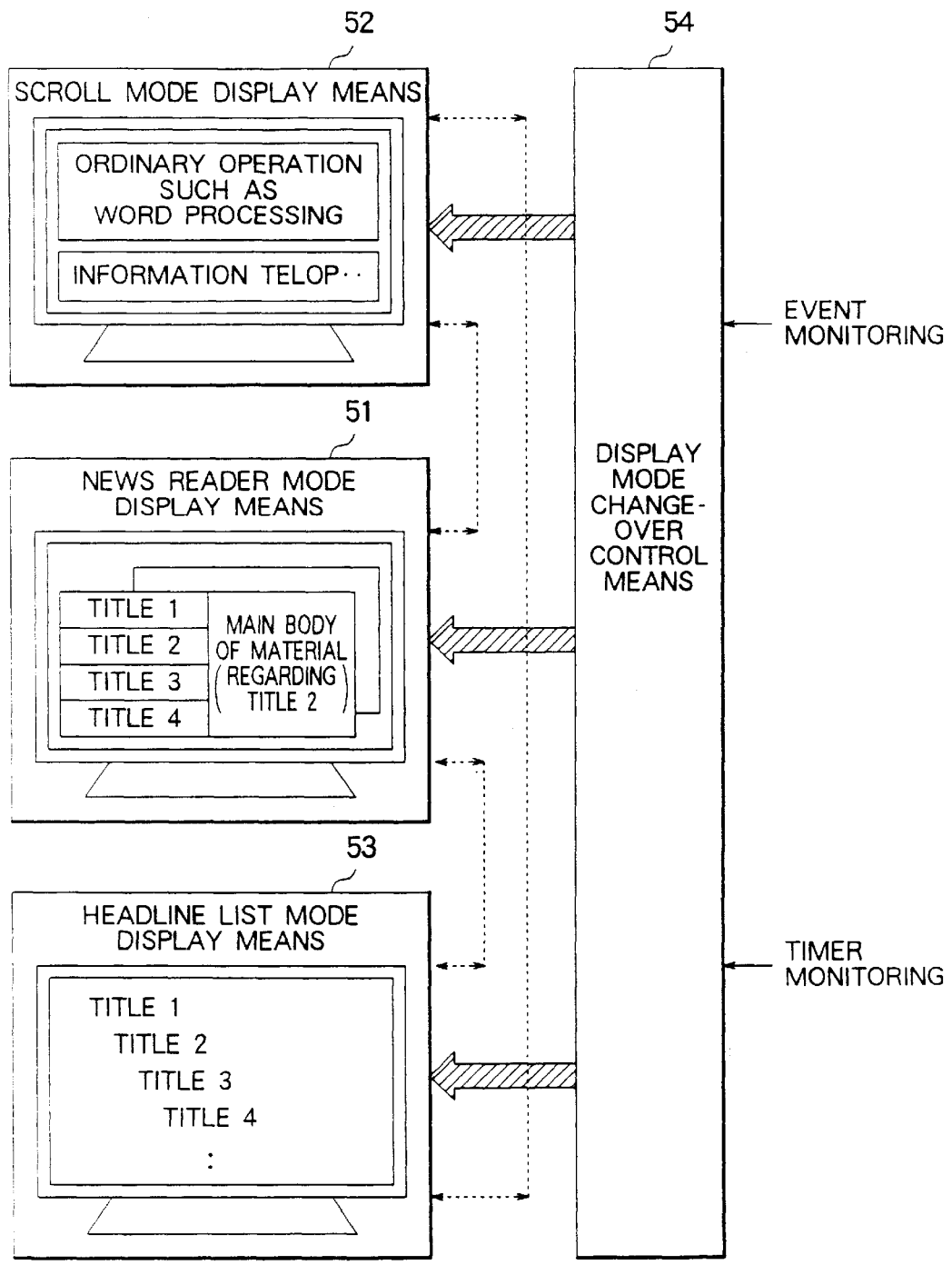
FIG. 17 is a principle/structure diagram of a second embodiment of the present invention.

FIG. 17 shows the principle/structure diagram of a second embodiment of the present invention. In the drawing, reference numeral 51 designates news reader mode display means; 52 designates scroll mode display means; 53 designates headline table display means; and 54 designates display mode changeover control means.

The news reader mode display means 51 displays on the client terminal external or intra-enterprise information supplied from various servers, i.e., business information. Of a plurality of materials that have been received and delivered, a specific material can be selectively displayed. In the news reader mode display, a lot of content items can be displayed in a hierarchical structure. A list of headlines are displayed below the content items, and the main body of the material selected from the list of headlines can be displayed on a browse screen.

When a routine-operation screen, such as a word processing operation screen, is being displayed, the scroll mode display means 52 repeatedly displays a headline in the form of a telop while scrolling the headline across a portion of the screen. In the scroll mode display, the user can become aware of the business information received from the server while performing routine tasks. The user can display the main body of material on the screen of the client terminal by double-clicking the headline being scrolled.

The headline list mode display means 53 displays a list of headlines over the entire screen. The headline list is displayed while being automatically updated. More specifically, the headline list is automatically displayed portion by portion at a given time interval or is displayed while the screen is scrolled. In this way, the headlines are displayed over the entire screen, and the display is changed with elapse of a time, thus preventing burning-in of the display.

The display mode changeover control means 54 displays the business information while changing its presentation form by controlling the foregoing three display means, i.e., the news reader mode display means 51, the scroll mode display means 52, and the headline list mode display means 53. The display mode changeover control means switches the form of presentation of the information by monitoring and detecting an event such as key pressing or mouse operation or by monitoring and detecting an inoperative state of a key or mouse for a given period of time through use of a timer. As mentioned above, the present invention enables switching of the form of presentation of the business information received from the server.

According to claim 6, the present invention provides an information reception and delivery system which displays on a display screen of a client terminal external or intra-enterprise business information received and delivered by way of a server, the system comprising: news reader mode display means which is capable of selecting a specific material from a plurality of materials that have been received and delivered and of displaying the thus-selected material; scroll mode display means which displays in a portion of a routine-operation display screen headlines of the business information in a scrolling manner; headline list mode display means which automatically displays a list of headlines of the business information over the entire screen surface and which updates the headlines; and display mode changeover control means for controlling switching among the news reader mode display means, the scroll mode display means, and the headline list mode display means, wherein the business information is displayed while its presentation form is changed.

Switching caused by the display mode changeover control means defined in claim 6 can be performed according to the way in which a terminal user uses the terminal (according to claim 7). The form of presentation of the business information can be switched in response to the switching operation of the display mode changeover control means (according to claim 8). Further, the business information can be displayed on the client terminal on the basis of an information management table in which there is determined whether or not information is displayed for each display mode according to the degree of necessity or openness (according to claim 9).

According to claim 10, the present invention provides an information reception and delivery method of displaying on a display screen of a client terminal external or intra-enterprise business information received and delivered by way of a server, wherein the business information is displayed while its presentation form is changed by controlling switching among a news reader mode display which permits selection a specific material from a plurality of materials that have been received and delivered and displaying of the thus-selected material; a scroll mode display which causes a routine-operation display screen headlines of the business information to be displayed in a scrolling manner in a portion of a routine-operation display screen; and a headline list mode display which causes a list of headlines of the business information to be automatically displayed over the entire screen surface and which causes updating of the headlines.

Switching of the display mode defined in claim 10 can be performed according to the way in which a terminal user uses the terminal (according to claim 11). The form of presentation of the business information can be switched in response to the switching of the display mode (according to claim 12). The business information can be displayed on the client terminal on the basis of an information management table in which there is determined whether or not information is displayed for each display mode according to the degree of necessity or openness (according to claim 13).

The second embodiment of the present invention will be described further by reference to FIG. 17. The news reader mode display means 51 displays on the client terminal external or intra-enterprise information supplied from various servers, i.e., business information. Of a plurality of materials that have been received and delivered, a specific material can be selectively displayed. The details of the business information to be displayed on the client terminal will be described later by reference to FIGS. 21 through 24. Throughout the specification, content items signify the type of information such as a weather forecast or sports. In the news reader mode display, a lot of content items can be displayed in a hierarchical structure. For example, a plurality of types of content items such as baseball or sumo can be displayed below the content items of sports. Further, a table of material headlines are displayed below the baseball or sumo. The main body of a material selected from the list of headlines can be displayed on the browse screen. The material headlines signify the title or abstract of material contained in the content items or a combination of the title and the abstract. When a simple term "headline" or "information headline" is used herein, the term signifies the contents title as well as the material headline, as required.

In the display having such a hierarchical structure, one screen can be divided into sub-divisions or can be switched to another screen. Further, information can be displayed over the entire screen or displayed such that a part of the screen is left unused. When a part of the screen is left unused, the user can recognize the routine task, such as word processing operations, which are current being carried out. Accordingly, the display can be switched to a routine-operation screen solely by clicking the small sub-screen.

The scroll mode display means 52 repeatedly displays headlines in the form of a telop by, e.g., horizontally scrolling them across, e.g., a lower portion of the screen while displaying the ordinary-operation screen such as a word processing operation screen. The height of the headlines being scrolled or the width of a display area of the headlines can be arbitrarily changed. Further, a scrolling rate can also be changed.

In the foregoing scroll mode display, the user can become aware of what kind of business information is received from the server while performing routine tasks. So long as the headline being scrolled is doubled-clicked, the main body of the thus-double-clicked specific material can be immediately displayed on the news reader mode display screen. The user can browse a specific material by selecting it on the display screen.

The headline list mode display means 53 displays a list of headlines over the entire screen. The headline list is displayed while being automatically updated. More specifically, the headline list is automatically displayed portion by portion at a given time interval or is displayed while the screen is scrolled. In this way, the headlines are displayed over the entire screen and are changed with elapse of a time, thus preventing burning-in of the display. The headlines can be updated by the user's key pressing or mouse operation.

The display mode changeover control means 54 displays the business information while changing its presentation form by controlling the foregoing three display means, i.e., the news reader mode display means 51, the scroll mode display means 52, and the headline list mode display means 53. The display mode changeover control means 54 switches the form of presentation of the information by monitoring and detecting an event such as key pressing or mouse operation or by monitoring and detecting an inoperative state of a key or mouse for a given period of time through use of a timer. In this way, the business information is displayed in a unique form of presentation such as a single line headline display or a headline list display according to switching of the display mode control means.

Figure 18:
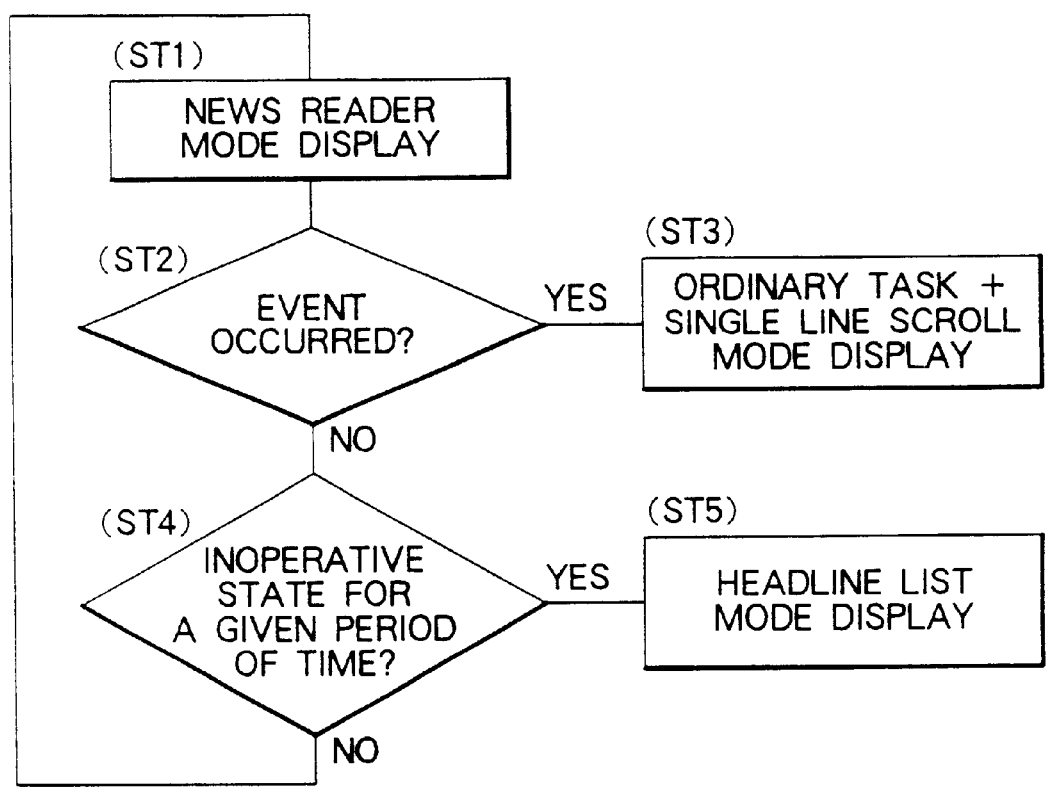
FIG. 18 is a flowchart showing the details of switching among display modes according to the embodiments, and more particularly, switching to another display mode while information is displayed in a news reader display mode.
Figure 19:
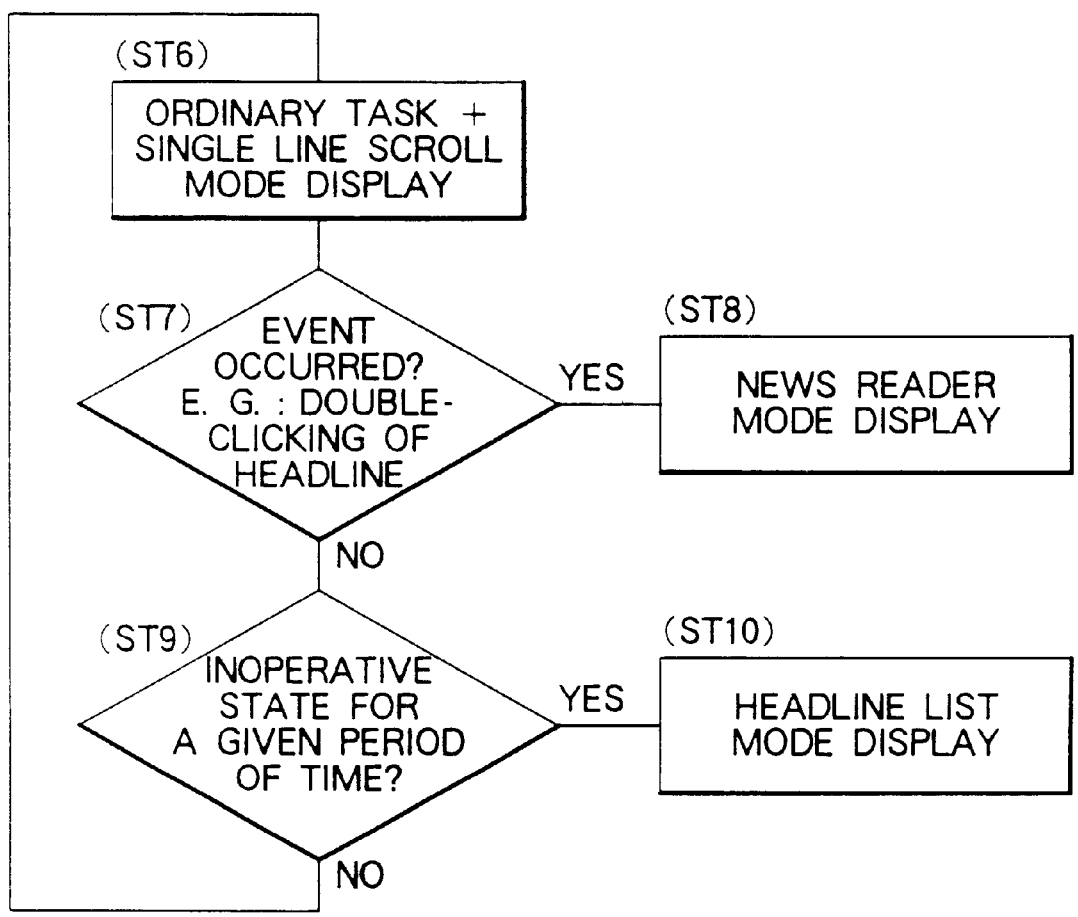
FIG. 19 is a flowchart showing the details of switching among display modes according to the embodiments, and more particularly, switching to another display mode while information is displayed in a single line scroll display mode.
Figure 20:
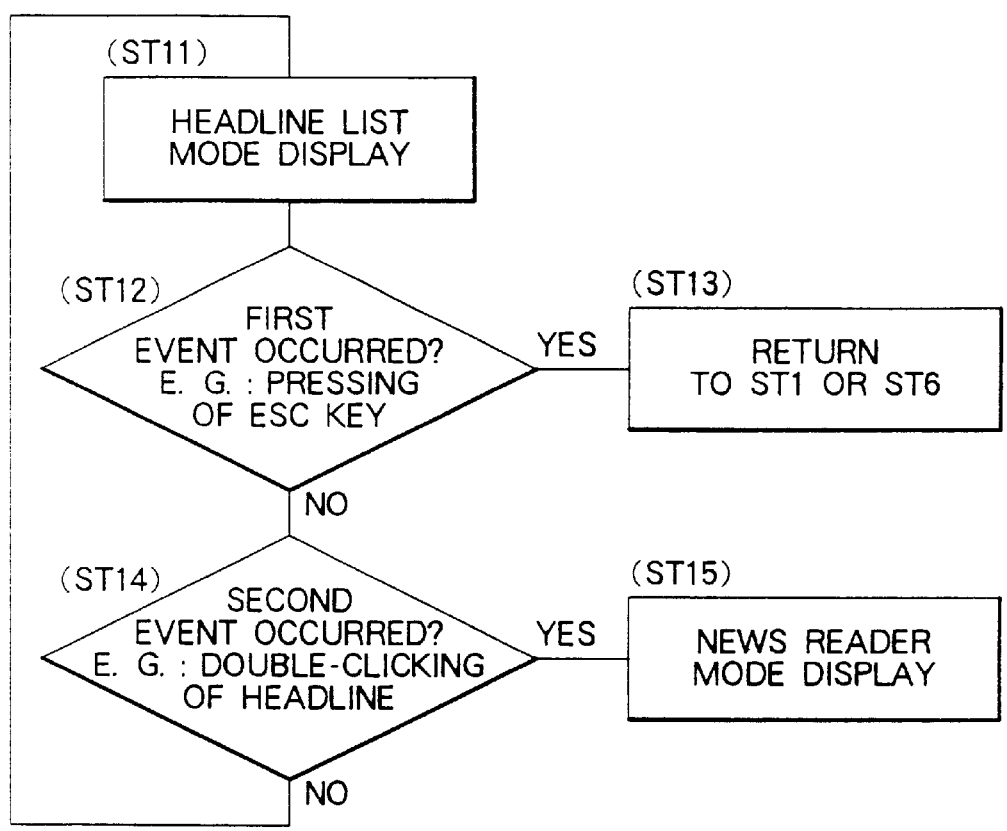
FIG. 20 is a flowchart showing the details of switching among display modes according to the embodiments, and more particularly, switching to another display mode while information is displayed in a headline table display mode.

FIGS. 18 through 20 are flowcharts showing the details of switching action according to the present invention. First, FIG. 18 shows switching to another display mode while information is displayed in a news reader display mode. The switching of display mode is performed according to the state in which the user uses the terminal, such as key pressing or mouse operation or by detection of the user having not operated the terminal for a given period of time.

Assume that information is displayed in a news reader mode display in step 1. In step 2, an event which represents "switching to another application", such as key pressing or mouse operation. If an event is detected, switching is made to another application, and the display screen is switched to a single line scroll mode display such as that performed in step 3. When the user returns to or newly starts a application program, such as a word processing program or a spreadsheet program, for ordinarily tasks while information is displayed in the news reader mode, such return or start operation can performed in accordance with a conventional known method such as pressing a specific key or operating the mouse. However, the screen for the ordinary tasks has a unique layout configured according to the present invention. More specifically, headlines of the business information are repeatedly displayed in the form of a telop while being horizontally scrolled across a portion of an ordinary-operation screen such as a word processing screen, e.g., a lower portion of the screen. If no event is detected, the processing proceeds to step 4.

In step 4, if it is detected that the user has not operated the client terminal for a given period of time as a result of monitoring action of a timer, the display mode is switched to a headline list mode display such as that performed in step 5. Otherwise, the news reader mode display would be continued. In the headline list mode display, a lot of information headlines are automatically displayed and switched at given time intervals over the entire screen or switched in response to the user's key pressing or mouse operation. Further, the screen can also be scrolled.

FIG. 19 shows switching to another display mode while information is displayed in a single line scroll display mode. As in the case of step 6, assume that the user is performing an ordinary task through use of such as a word processing application or a spread sheet application. At this time, the business information, e.g., headlines, is repeatedly displayed in the form of a telop while being scrolled across a portion of the display screen, e.g., a lower portion of the screen. In the single line scroll mode display, the user can become aware of headlines of the business information being scrolled across a lower portion of the screen while performing ordinary tasks such as word processing operations or spreadsheet operations. When the user desires to know the details of the material corresponding to the headline, the display screen is switched to the news read mode display. Such switching is effected when an event representing "switching to a news reader mode display" is detected in step 7. For example, when it is detected that the user double-clicks the headline being scrolled, the display screen is switched to the news reader mode display in step 8.

When the user having not operated the terminal for a given period of time is detected in step 9 through monitoring by the timer, the display mode is switched to the headline list mode display in step 10. Otherwise, the single line scroll mode display would be continually indicated in a lower portion of the ordinary-operation screen.

FIG. 20 shows switching to another display mode while information is displayed in a headline table display mode. As mentioned previously, when an inoperative state is detected for a given period of time during the news reader display mode or the single line scroll display mode through timer monitoring operations, switching is made to the headline list mode display. As described in step 11, assume that there is a headline list mode display. At this time, all headlines of information are displayed over the entire screen, and the headlines of the business information are automatically updated on the display screen. More specifically, the list of headlines is automatically displayed portion by portion at given time intervals. Alternatively, the list of headlines is sequentially displayed while the screen is scrolled. As mentioned above, the information is displayed over the entire screen while the display is being changed with elapse of time, thus realizing a screen saver for preventing burning-in of the display.

When an event is detected, switching is made from the headline list mode display shown in step 11 to another mode display. For example, if the pressing of the ESC key is detected, the display returns to the original state of the ordinary task interrupted (step 13). If a second even, e.g., double-clicking of the mouse on the headline, is detected in step 14, switching is made to a news reader mode display in step 15. As a result of the switching action, the main body of the specific material double-clicked can be displayed. However, a selection screen may be displayed so as to enable selection of a specific material, thus displaying the main body of the specific material.

FIGS. 21 through 24 show one example of a management table of display content items for each display mode. First, FIG. 21 shows a list of original content items held in the server. When delivering various types of information to the user, the server manager appends a "mandatory" attribute to information which has a high degree of importance and is desired to be read by the employees, e.g., intra-enterprise notices or news from the general secretary section, depending on the degree of need. Further, depending on the degree of openness, employees are not allowed to make an access to some information items, and solely executives are allowed to make an access to them. In short, the persons who can browse some information items are limited by requiring a password at the time of acquisition of the information items. Further, the employees are prohibited from browsing information which has a high degree of preference and is unnecessary to browse, e.g., information regarding gambling or pornography. The original contents list assigned "mandatory" or "prohibited" or "limited" attributes is registered in the server.

The user can freely customize the original contents list into a contents list for use with a news reader mode display, a contents list for use with a single line scroll mode display, or a contents list for use with a headline mode display according to his preference. More specifically, the user can freely determine whether or not content items are displayed or the order in which content items are displayed. However, the user is not allowed to delete the content items assigned "mandatory." The user possesses, in a server or a client terminal, a management table set for each user: that is, a management table of a contents list for a news reader mode display purposes such as that shown in FIG. 22; a management table of a contents list for a single line scroll display purpose such as that shown in FIG. 23; and a management table of a contents list for a headline list mode display purpose such as that shown in FIG. 24. Through use of such management tables, the user can display on the client terminal the information customized for each user and for each display mode, depending on a degree of need or openness.

Although the present invention has been described as a system and/or method in the foregoing descriptions, the system and/or method may be written as information in a storage medium such as a flexible disk or CD-ROM. Alternatively, the system and/or method may be downloaded into a storage medium such as hard disk. The system stored in any form should be construed as falling into the technical scope of the present invention.

Third Embodiment

Figure 25:
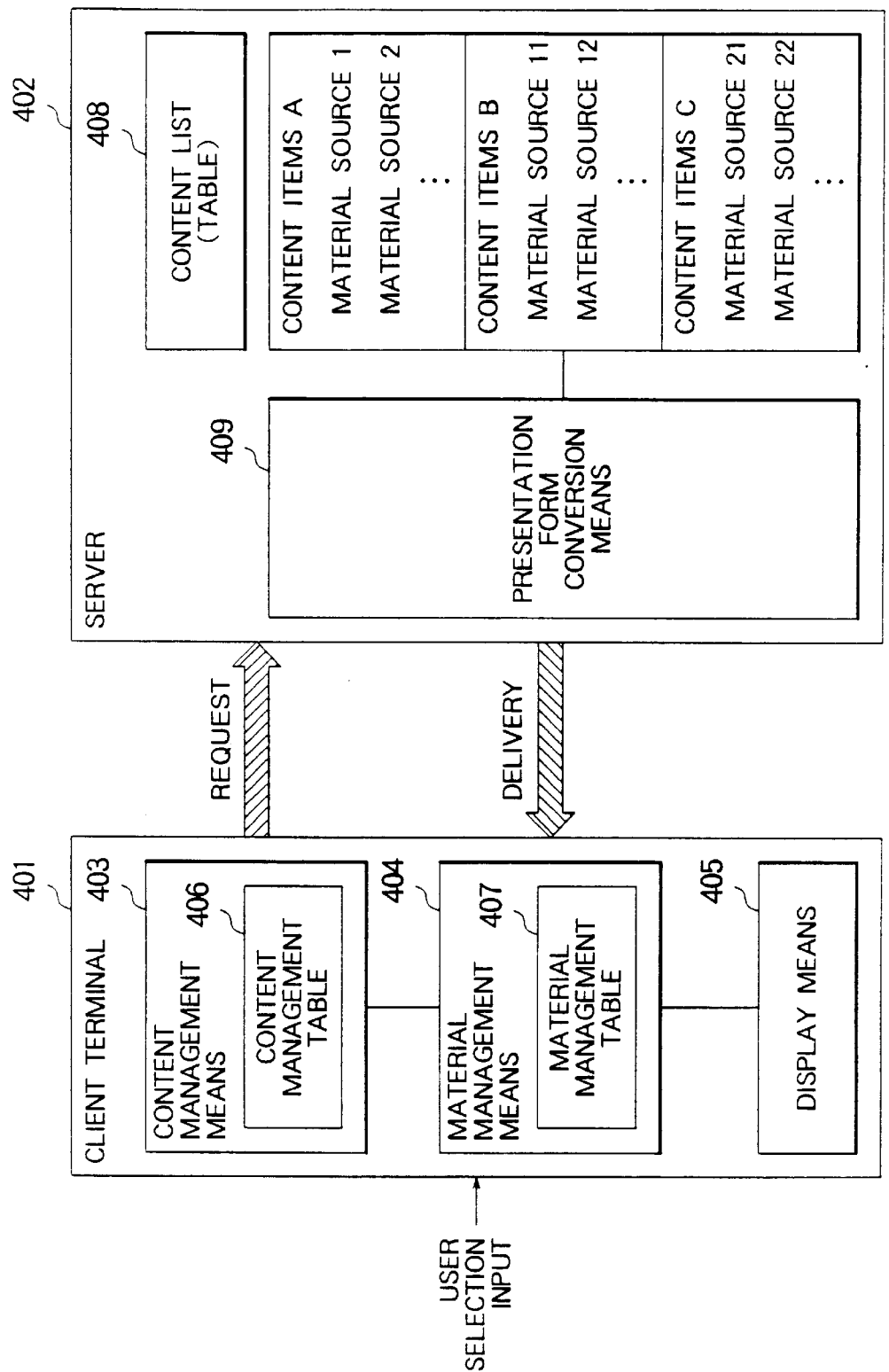
FIG. 25 is a principle/structure diagram of a third embodiment of the present invention.

FIG. 25 shows the principle and structure of a third embodiment of the present invention. In the drawing, reference numeral 401 designates a client terminal; 402 designates a server; 403 designates contents management means; 404 designates material management means; 405 designates display means; 406 designates a contents management table; 407 designates a material management table; 408 designates a contents list; and 409 designates presentation form conversion means.

In FIG. 25, the server 402 which delivers business information to the client terminal 401 delivers a contents list, and content items A, B, and C. The server 402 is physically formed from a plurality of servers. For example, in the server 402, a server for providing a contents list and a server for providing content items A, B, and C may be formed separately from each other. The contents list is a list of all the content items that the server 402 can provide. In the contents list, "mandatory" attribute, a "prohibited" attribute, or a "limited" attribute for limiting access is assigned to each content item. In short, the degree of need or openness is set for content items. The server 402 supplies the client terminal with a material list contained in each content item and the contents of the material in response to a request. At that time, the display mode conversion means provided in the server provides such information after having converted the form of presentation of the information into another presentation form differing from that of the material source stored in the server 402.

The client terminal 401 is equipped with the contents management means 403, the material management means 404, and the display means 405. The contents management means 403 acquires a contents list which is stored in the server 402 and for which the degree of necessity or openness is determined. The thus-acquired content list is edited to prepare the contents management table 406 for use with a client and for browsing purposes. When a specific content item is selected, the contents management means 403 requests the server 402 to provide a material list contained in the content item, on the basis of the contents management table 406.

The material management means 404 prepares the material management table 407 for each content from a material list returned from the server 402 in response to the request from the contents management means 403. When a specific material is selected, the delivery of the material is requested to the serer 402, on the basis of the management table 407. The display means 405 displays on the client terminal the specific material delivered from the server 402 after conversion of the presentation form of the material source.

According to claim 14, the present invention provides an information reception and delivery system, wherein is delivered to and displayed on a display screen of a client terminal business information which is supplied from outside the corporation or from within the corporation and which contains a plurality of content items, the system comprising: a server which stores a contents list, material sources included in the content items, and a list of the material sources and which provides material sources whose presentation forms are converted, in response to a material delivery request from the client terminal; and contents management means, material management means, and display means provided in the client terminal, wherein the contents management means requests the server to provide a material list contained in a selected content item, on the basis of the contents management table for browsing purposes in which a degree of necessity or openness is determined for each client; the material management means requests to the server to provide a selected material, on the basis of a material management table which is formed for each of content items from a material list returned from the server; and the display means displays on the client terminal the material returned from the server.

The conversion of presentation form defined in claim 14 can be carried out in a consolidated manner that is common among the plurality of content items (according to claim 15). The contents management table for browsing purposes can be edited from an original contents list which is stored in the server and in which a degree of necessity or openness is determined (according to claim 16). In order to prevent materials from being delivered at too high a volume at a specified time, a time can be decentralized by setting an extent of time when the server is requested to deliver the materials at the specified time (according to claim 17).

According to claim 18, the present invention provides an information reception and delivery method of delivering to and displaying, on a display screen of a client terminal, business information which is supplied from outside the corporation or from within the corporation and which contains a plurality of content items, wherein a server stores a contents list, material sources included in the content items, and a list of the material sources and provides material sources whose presentation form is converted, in response to a material delivery request from the client terminal; and the client terminal requests, when content items are selected, with respect to the server a material list contained in a selected content item, on the basis of a contents management table for browsing purposes in which a degree of necessity or openness is determined for each client; requests, when a specific material is selected, the specific material with respect to the server, on the basis of a material management table which is formed for individual content items from a material list returned from the server; and displays on the client terminal the specific material returned from the server.

The conversion of presentation form defined in claim 18 can be carried out in a consolidated manner that is common among the plurality of content items (according to claim 19). The contents management table for browsing purposes can be edited from an original contents list which is stored in the server and in which a degree of necessity or openness is determined (according to claim 20). In order to prevent materials from being delivered at too high a volume at a specified time, a time can be decentralized by setting an extent of time when the server is requested to deliver the materials at the specified time (according to claim 21).

In FIG. 25, the server 402 which delivers business information to the client terminal 401 delivers a contents list, and content items A, B, and C. The server 402 is physically formed from a plurality of servers. For example, in the server 402, a server for providing a contents list and a server for providing content items A, B, and C may be formed separately from each other. The contents list is a list of all the content items that the server 402 can provide. In the contents list, a "mandatory" attribute, a "prohibited" attribute, or a "limited" attribute for limiting access is assigned to each content item. In short, the degree of need or openness is set for content items. The server 402 supplies the client terminal with a material list contained in each content or the content items of material in response to a request. At that time, the display mode conversion means provided in the server provides such information after conversion of the form of presentation of them into another presentation form differing from that of the material source stored in the server 402.

The client terminal 401 is equipped with the contents management means 403, the material management means 404, and the display means 405. The contents management means 403 acquires a contents list which are stored in the server 402 and for which the degree of necessity or openness is determined. The thus-acquired contents list is edited to prepare the contents management table 406 for use with a client and for browsing purposes. When a specific content item is selected, the contents management means 403 requests the server 402 to provide a material list contained in the content item, on the basis of the contents management table 406.

The material management means 404 prepares the material management table 407 for each content from a material list returned from the server 402 in response to the request from the contents management means 403. When a specific material is selected, the delivery of the material is requested to the serer 402, on the basis of the management table 407. The display means 405 displays on the client terminal the specific material delivered from the server 402 after conversion of the presentation form of the material source.

Figure 26:
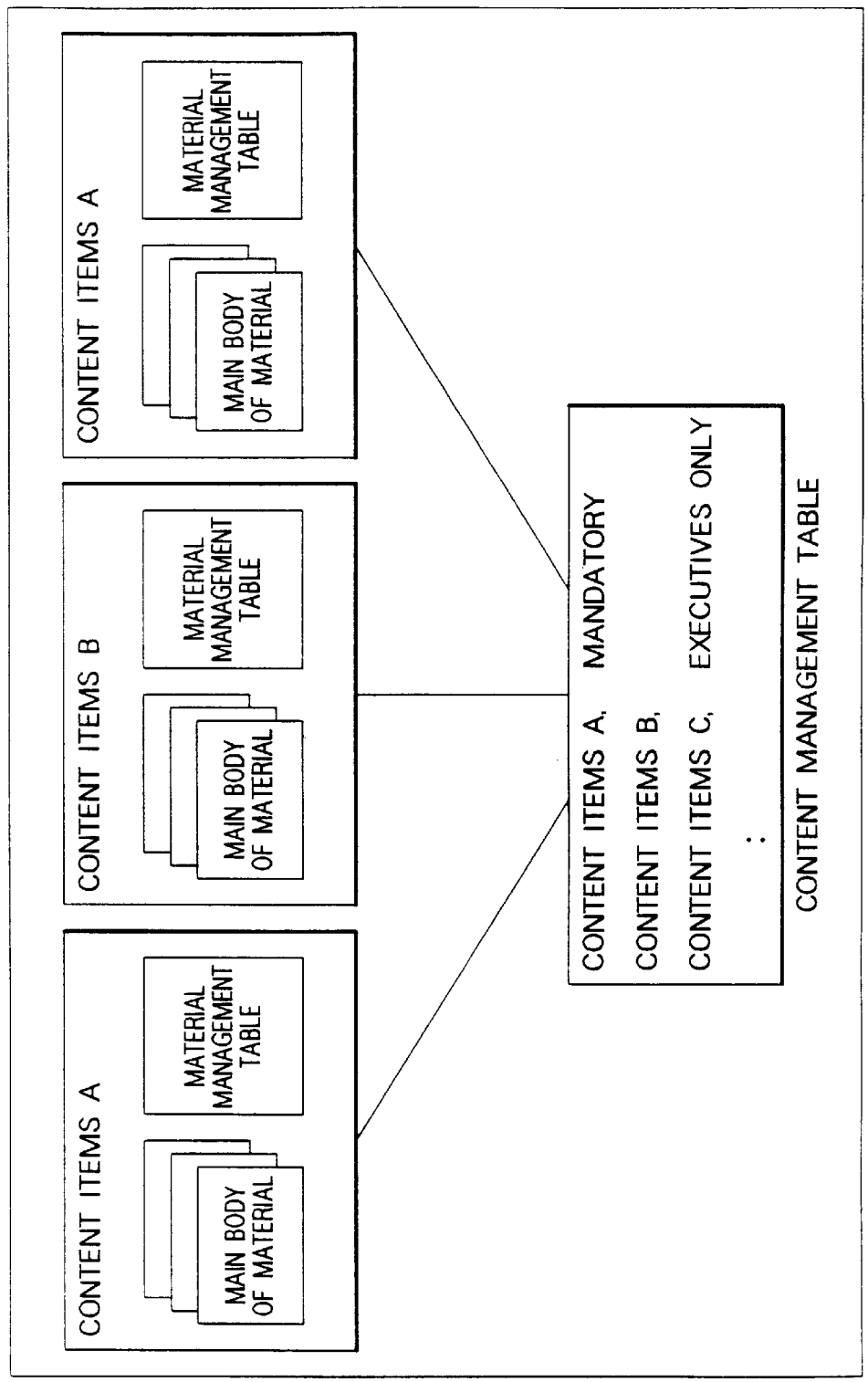
FIG. 26 is a schematic representation showing contents management means.

Next, the contents management means 403 will be described in more detail by reference to FIG. 26. FIG. 26 is a schematic representation showing the contents management means. The following descriptions are explained by reference to one example of an original contents list provided in the server as shown in FIG. 21 and to one example of a contents list shown in FIG. 22, which is set by the client by editing the original contents list.

Throughout the specification, content items signify the type of information such as a weather forecast or sports. A lot of content items can be displayed in a hierarchical structure. For example, a plurality of types of content items such as baseball or sumo can be displayed below the content items of sports. Further, a material list is formed below the content items of sports. So long as a specific material is selected from the material list, the main body of the thus-selected material can be displayed on a browse screen.

When delivering various types of information to the user, the server manager appends a "mandatory" attribute to information which has a high degree of importance and is desired to be read by the employees, e.g., intra-enterprise notices or news from the general secretary section, depending on the degree of need. Further, depending on the degree of openness, employees are not allowed to make an access to some information items, and solely executives are allowed to make an access to them. In short, the persons who can browse some information items are limited by requiring a password at the time of acquisition of the information items. Further, the employees are prohibited from browsing information which has a high degree of preference and is unnecessary to browse, e.g., information regarding gambling or pornography. The unique contents list assigned "mandatory" or "prohibited" or "limited" attributes is registered in the server.

The user can freely customize a contents list for browsing purposes from the original contents list. More specifically, the user can freely determine whether or not content items are displayed or the order in which content items are displayed. However, the user is not allowed to delete the content items assigned "mandatory." The user possesses, in a server or a client terminal, a management table set for each user, and the management table can be provided within the server. Through use of such management tables, the user can display on the client terminal the information customized for each user and for each display mode, depending on a degree of need or openness.

FIG. 26 is a schematic representation showing a relationship among a contents management table managed by the contents management means 403 and the content items managed by the contents management table. All the content items A, B, and C are managed by the contents management table. As mentioned previously, the contents management table is a list of content items for each of which a degree of necessity or openness is determined. The contents management table is associated with the individual content items. The material management means 404, which will be described later, manages the main body of the material within each content shown in FIG. 26, on the basis of the material management table.

Figure 27:
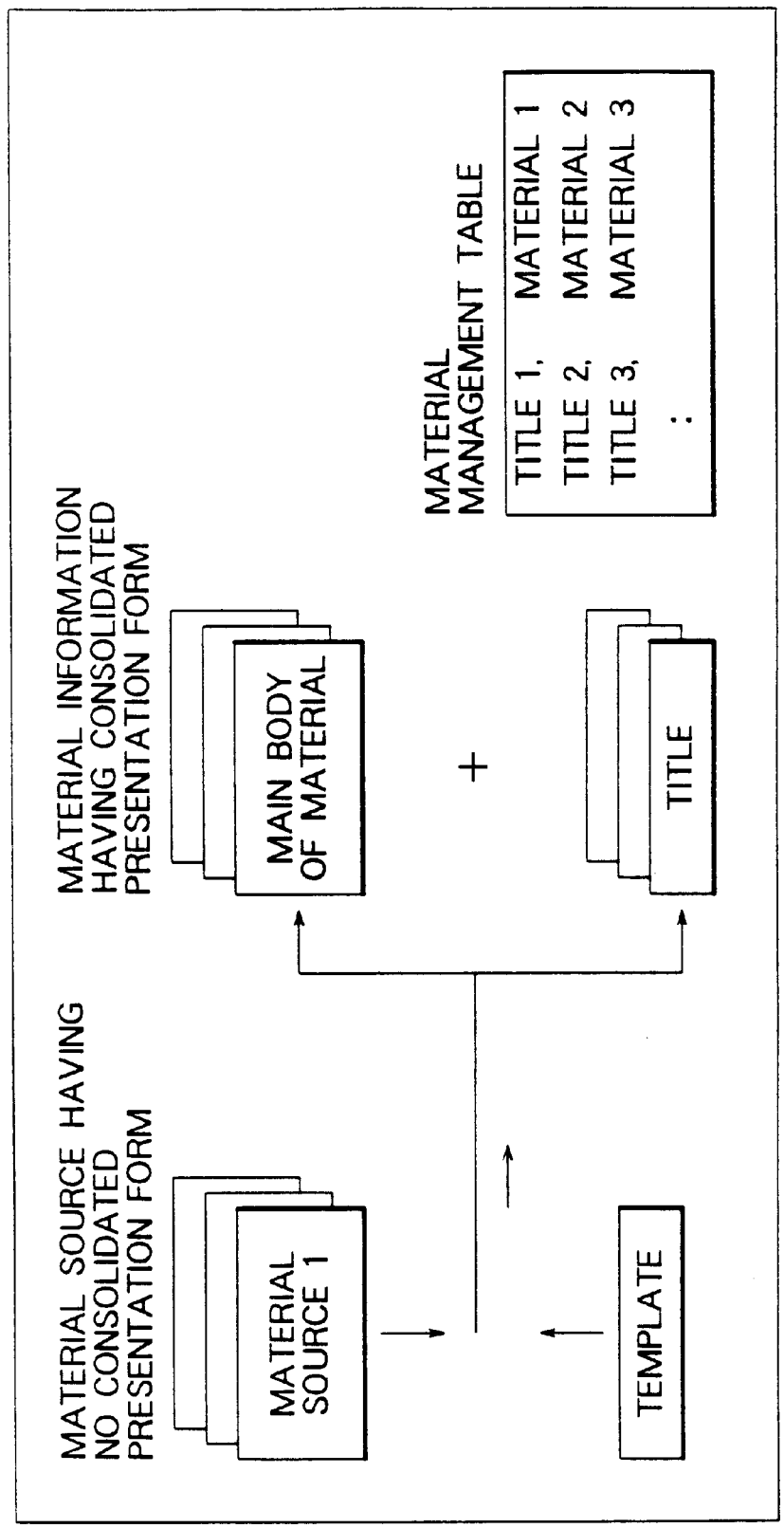
FIG. 27 is a schematic representation showing material management means.

Next, FIG. 27 is a schematic representation showing material management means which manages individual materials on the basis of the material management table. The material management table is provided for each of content items and manages a plurality of materials included in the content.

The material source, which will be described here, is stored in the server. Since the server can be physically formed from a plurality of content items providing servers, there is no consolidated presentation form (e.g., format or style). A template is used for filtering the material sources having different format or style and consolidating the material sources into a consolidated format. After having passed through the template corresponding to the presentation form conversion means 409 shown in FIG. 25, the material sources are converted into material data which contain at least titles and main bodies of materials. The material management table provided for each content is a list in which all the materials are related to their titles.

Figure 28:
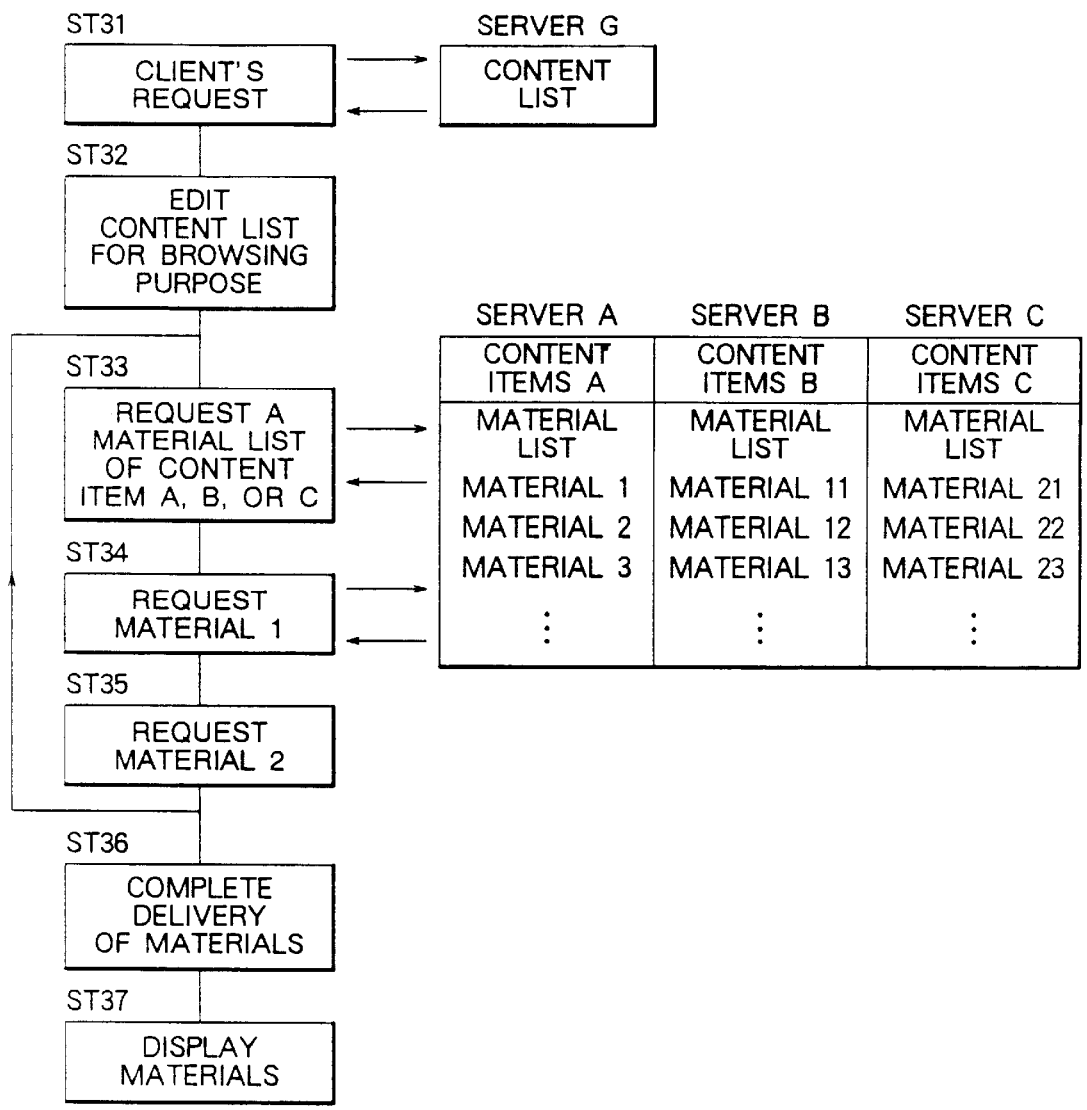
FIG. 28 shows a procedure of processing performed between a server and a client terminal.

The operation of the information reception and delivery system according to the third embodiment will now be described by reference to FIG. 28. FIG. 28 shows a procedure of processing performed among the server and the client terminal. First, in step 31, the client terminal requests the server G to provide a contents list managed by the server G and gains the contents list. The contents list returned from the client terminal is stored within the client terminal. The contents list is an original contents list in which a "mandatory" attribute, a "prohibited" attribute, and a "limited" attribute are assigned to the content items, as pervasively mentioned in association with FIG. 21. On the basis of the thus-acquired original contents list, in step 32 each client terminal edits the contents list for browsing purpose which is customized according to the preference of the user. The thus-edited contents list is stored in the client terminal or can be stored in the server G. Through the foregoing editing operation, content items—which are not desired to be browsed—can be deleted, or the order in which the content items are displayed can be changed. However, the content items assigned the "mandatory" attribute cannot be deleted.

Next, in order to acquire the material of content item A—which is one of the content items included in the thus-edited contents list for browsing purpose—on the basis of the contents list, in step 33 the client requests the server A—which is the source of the required content items A—to provide a material list. Although the client terminal can be designed such that the material archive returned from the server A is directly browsed, the archive is usually stored in the client terminal. In step 35, if necessary, there will be repeated the procedures which are the same as those in step 34. Such a storing operation will be referred to as a download.

The thus-stored materials are accumulated in the client terminal, and the amount of storage available on the disk is reduced. However, the materials have an expiration date. Therefore, if a specified number of dates has elapsed, the material is deleted. The date set for effectiveness is determined on the basis of a default number of days defined in a content items providing server, e.g., seven days for news or one day for weather forecast. Since the user can change the default expiration date set in the information of content items, the user can perform customization according to his preferences in consideration of the capacity of the disk.

Further, so long as the procedures performed in steps S33 to S35 are repeatedly carried out with respect to the identical server A or another server B or C, as required, materials of other content items can be obtained. In step 36, the material delivery processing is terminated. In step 37, the client unarchives the material archives returned from the server and stored in the client terminal and displays and browses the individual materials.

With regard to acquisition of the material list in step 33 or acquisition of materials in step 34 or 35, the material list or the materials are downloaded under conditions set by the user: namely, (1) when the client terminal is not in use (i.e., a screen saver operates); and (2) at a specified time (early in the morning, a lunch time, or intermission in the afternoon). For this time, the extent of time standardized by the sever manager is defined as a default time. The user is allowed to change the default value defined by the server manager to another period of time according to his preferences. In order to prevent downloading of data at too high a volume during a specific time such as a lunch time, the time to download data is decentralized within a range of time specified by the user, e.g., 12:00 through 12:45. Even with regard to a retry wait time in the event of a download failure stemming from intensive loads, the user can change and customize the default value defined by the server manager, e.g., 90 sec.

Although the present invention has been described by reference to the information reception and delivery system and/or method in the preceding embodiments, the system and/or method may be written as information into a storage medium such as a flexible disk or CD-ROM. Further, the system and/or method may be downloaded into a storage medium such as a hard disk. Both of these cases should be construed as falling into the technical scope of the invention.

INDUSTRIAL UTILITY

As has been described above, in an information reception and delivery system according to the present invention which receives information over a network, reception information can be retained beforehand for each content by managing a directory for each content of information that has been opened. Therefore, global information and private information can be managed in a consolidated manner while discriminating them from one another, thus enabling management of reception and delivery of archives of the global and private information items. Accordingly, when a private network and a global network are connected together, information which is to be received/delivered within the private network and information received from the global network can be handled in a consolidated manner while discriminating them from each other.

According to the present invention, when external or intra-enterprise business information received and delivered by way of a server is displayed on a display screen of a client terminal, the business information can be displayed, while the display mode is ready and arbitrary changed among a news reader mode display, a scroll mode display which displays in a portion of a routine-operation display screen headlines of the business information in a scrolling manner, and a headline list mode display which displays a list of headlines of the business information over the entire screen surface. Particularly, as a result of headlines of business information being displayed in a portion of the routine-operation display screen in a scrolling manner, the present invention enables the user to become aware of, real time, business information such as external information or intra-enterprise information received and delivered by way of various servers while continually performing ordinary tasks. If necessary, the user can display the details of the information on the client terminal by switching.

Further, according to the present invention, a list of headlines are displayed over the entire screen and are automatically updated on the screen, thus realizing a screen saver function for preventing burning-in of a display screen.

In addition, according to the present invention, the switching caused by the display mode changeover control means can be performed easily and arbitrarily according to the way in which a terminal user uses the terminal. Still further, according to the present invention, the form of presentation of the business information can be arbitrarily changed in response to a switching operation of the display mode changeover control means according to the preferences of the user. Yet further, according to the present invention, the business information displayed on the client terminal is readily customized according to the user's preferences, on the basis of an information management table in which a determination is made as to whether or not information is displayed for each display mode according to a degree of necessity or openness.

According to the present invention, when business information—which is supplied from outside the corporation or from within the corporation and which contains a plurality of content items—is delivered to and displayed on a display screen of a client terminal, the present invention makes it possible to consolidate the forms of presentation of information into one presentation form common among the plurality of content items by providing the material sources stored in the server to the client terminal while their presentation forms are converted.

According to the present invention, since there is provided a contents management table, the user can display on the client terminal the information customized for each user according to a degree of necessity or openness of information. Further, an original contents list is provided common among content items, enabling the user to readily prepare such a contents management table.

According to the present invention, content items and materials included therein are managed by means of separate management tables, simplifying a data structure and a system configuration. More specifically, the client terminal is arranged so as to request the server to provide solely a contents list at first, a material list included in a specific content item, and the main body of the material at last, thus simplifying the system configuration.

According to the present invention, there is set a range of time for request of delivery of materials from the server to the client terminal, there is yielded the advantage of being able to prevent delivery of materials at too high volume at a specified time and to decentralize the time during which materials are delivered.

What is claimed is:

1. An information reception and delivery system receiving and delivering private information and global information, the system comprising:

a server provided in an internal network; and a high-level server provided at higher level than the server in the internal network;

wherein the high-level server further comprises:

a global directory table retaining a directory of the global information, wherein the directory of the global information is received from an external network, and comprises a source of the global information and reception information used for receiving the global information, the global information being opened to the public, and the external network being connected to the internal network; and a private directory table retaining a directory of the private information, wherein the directory of the private information is delivered within the internal network, and comprises a source of the private information and reception information used for receiving the private information, the private information being produced within the internal network;

wherein the high-level server delivers the directory which is allowed to be delivered and the directory of the global information and the directory of the private information to the server by using the global directory table and the private directory table;

wherein the server further comprises:

a directory table retaining the directories of the global information and the private information delivered from the high-level server; and wherein the server receives and stores the directory delivered from the high-level server in the directory table, and downloads the global information and the private information by using the directory stored in the directory table.

2. An information reception and delivery system as defined in claim 1 further comprising:

a low-level server provided at lower level than the server in the internal network; wherein the server further comprises:

a directory management program managing reception and delivery of the directory performed by the high-level server and the low-level server; and a directory management table storing for each directory a delivery enabling flag and an upload enabling flag, the delivery enabling flag representing whether or not the directory is allowed delivery from the high-level server to the low-level server, and the upload enabling flag representing whether or not the directory is allowed uploading from the low-level server to the high-level server; and wherein the directory management program manages delivery of a directory from the high-level server to the low-level server and uploading of a directory from the low-level server to the high-level server by using the directory management table.

3. An information reception and delivery system as defined in claim 2 further comprising:

a client provided at lower level than the low-level server in the internal network;

wherein one of the high-level server, the server and the low-level server transfers from the source of the global information and the private information an archive which is the global information and the private information and stores the transferred archive; and wherein the client refers to the archive stored in one of the high-level server, the server and the low-level server.

4. An information delivery system as defined in claim 3, wherein the server further comprises:

a mirror management table storing information to be mirrored and an archive storage position specifying an area in a mirror storage region;

a mirror storage region storing the archive of the information to be mirrored; and a mirror control program executing a mirroring operation by transferring the archive of the information to be mirrored from a source of the archive to the specified area of the mirror storage region by reference to the mirror management table.

5. An information reception and delivery system comprising:

a client terminal requesting delivery of an information, the information containing a plurality of content items and being delivered to and displayed on a display screen; and a server storing the information which includes a contents list of the plurality of content items, material sources included in the plurality of content items, and a material list of the material sources and, providing the material sources which are converted in presentation form in response to the request from the client terminal;

wherein the client terminal further comprises:

a contents management table determining a degree of necessity or openness for each client to browse;

a contents management requesting device to request the server to provide a material list contained in a selected content item on the basis of the contents management table;

a material management table formed for each of content items from a material list returned from the server in response to the request from the contents management requesting device;

a material management requesting device to request the server to provide a selected material on the basis of the material management table; and a display to display on the client terminal a material returned from the server in response to the request from the material management requesting device, and wherein the materials are processed in a consolidated manner such that the presentation forms of the information become common among the plurality of content items, the materials being supplied from the server while presentation forms of their information sources are converted.

6. An information reception and delivery system as defined in claim 5, wherein the contents management table is edited from the contents list originally stored in the server, the contents list determining a degree of necessity or openness.

7. An information reception and delivery system as defined in claim 5, wherein a delivery time is decentralized by setting an extent of time when the server is requested to deliver the materials, wherein materials are prevented from being delivered at too high a volume at a specified time.

8. A computer readable recording medium storing a program for implementing with a computer receiving and delivering private information and global information, the program comprising:

a global directory table provided in a high-level server and retaining a directory of the global information, the directory of the global information comprising a source of the global information and reception information used for receiving the global information and being received from an external network, the global information being opened to the public, the high-level server provided at higher level than a server in the internal network, and the external network being connected to the internal network;

a private directory table provided in the high-level server and retaining a directory of the private information, the directory of the private information comprising a source of the private information and reception information used for receiving the private information and being delivered within the internal network, and the private information being produced within the internal network; and a directory table provided in the server and retaining the directory of the global information and the private information delivered from the high-level server, the server provided in an internal network; and wherein the program causes the high-level server to deliver the directory which is allowed to be delivered and which is of the global information and the private information to the server by using the global directory table and the private directory table; and wherein the program causes the server to perform receiving and storing the directory delivered from the high-level server in the directory table, and downloading the global information and the private information by using the directory stored in the directory table.

9. An information reception and delivery method for delivering information from a server to a client terminal and displaying the information on a display screen of the client terminal, the method comprising:

storing in the server the information which includes a plurality of content items, a contents list of the plurality of content items, material sources included in the plurality of content items, and a material list of the material sources;

providing from the server to the client terminal the material sources which are converted its presentation form in response to a request from the client terminal;

requesting from the client terminal to the server to provide a material list contained in a selected content item on the basis of a contents management table, the contents management table determining a degree of necessity or openness for each client to browse;

requesting from the client terminal to the server to provide a selected material on the basis of a material management table, the material management table being formed for each of content items from a material list returned from the server in response to the request; and displaying on the client terminal a material returned from the server in response to the request; and wherein the materials are processed in a consolidated manner such that the presentation forms of the information become common among the plurality of content items, the materials being supplied from the server while presentation forms of their information sources are converted.

10. An information reception and delivery method as defined in claim 9, wherein a time is decentralized by setting an extent of time within which the server is requested to deliver the materials at the specified time, wherein materials are prevented from being delivered at too high a volume at a specified time.

* * * * *

UNITED STATES PATENT AND TRADEMARK OFFICE
CERTIFICATE OF CORRECTION

PATENT NO.    : 6,247,012 B1
DATED         : June 12, 2001
INVENTOR(S)   : Koji Kitamura et al.

It is certified that error appears in the above-identified patent and that said Letters Patent is hereby corrected as shown below:

Title page,
Item [56], FOREIGN PATENT DOCUMENTS, add
-- 4-267654    9/1992  (JP)
6-62050        3/1994  (JP) --.

OTHER PUBLICATIONS, add
-- Journal of Uoeh, Vol. 17, No. 3, 1995, p. 207-213, September 1, 1995, (Limitation on range of distribution of articles (page 209, right column), and limitation on subscribed articles (page 210, right column))

Nikkei Open System, The May issue, 1996 (No. 38) p. 240-267, May 15, 1995 (Particularly refer to page 243, Photo 1; page 248, Photo 2, page 252)

Yunikkusu Magazine, The December issue, 1995 p. 63-73, December 1, 1995 (Particularly refer to page 63, right column to page 64)

Reports of Information Processing Society of Japan, Vol. 95, No. 61, 1995, p. 49-54, July 13, 1995 (Idea of Performing selective distribution of articles) --.

Column 8,
Line 39, change "directly" to -- directory --;
Line 41, change "directly" to -- directory --;
Line 44, change "directly" to -- directory --.

Column 11,
Line 64, change "there" to -- these --.

Column 12,
Line 15, change "able" to -- table --;
Line 26, change "affair" to -- affairs --;
Line 65, change "able" to -- table --.

Column 16,
Line 48, change "reds" to -- reads --.

UNITED STATES PATENT AND TRADEMARK OFFICE
CERTIFICATE OF CORRECTION

PATENT NO.    : 6,247,012 B1
DATED         : June 12, 2001
INVENTOR(S)   : Koji Kitamura et al.

It is certified that error appears in the above-identified patent and that said Letters Patent is hereby corrected as shown below:

<u>Column 20,</u>
Line 18, change "operation" to -- operation may occur --;
Line 23, change "ordinarily" to -- ordinary --.

<u>Column 27,</u>
Line 2, change "arbitrary" to -- arbitrarily --.

<u>Column 29,</u>
Line 21, change "and," to -- , and --.

<u>Column 30,</u>
Line 39, change "its" to -- in --.

Signed and Sealed this

Eleventh Day of June, 2002

Attest:

JAMES E. ROGAN
*Attesting Officer*        *Director of the United States Patent and Trademark Office*